(12) United States Patent
Futterer et al.

(10) Patent No.: US 8,427,725 B2
(45) Date of Patent: Apr. 23, 2013

(54) LIGHT MODULATING DEVICE

(75) Inventors: Gerald Futterer, Dresden (DE); Bo Kroll, London (GB); Steffen Buschbeck, Erfurt (DE)

(73) Assignee: Seereal Technologies S.A., Munsbach (LU)

( * ) Notice: Subject to any disclaimer, the term of this patent is extended or adjusted under 35 U.S.C. 154(b) by 364 days.

(21) Appl. No.: 12/738,704

(22) PCT Filed: Oct. 20, 2008

(86) PCT No.: PCT/EP2008/064083
§ 371 (c)(1),
(2), (4) Date: Apr. 19, 2010

(87) PCT Pub. No.: WO2009/050294
PCT Pub. Date: Apr. 23, 2009

(65) Prior Publication Data
US 2010/0277779 A1 Nov. 4, 2010

(30) Foreign Application Priority Data

Oct. 19, 2007 (GB) .................................. 0720483.7
Jul. 21, 2008 (EP) .................................. 08160789

(51) Int. Cl.
*G03H 1/10* (2006.01)
*G03H 1/26* (2006.01)
*G02F 1/03* (2006.01)
*G02F 1/01* (2006.01)
*G09G 3/36* (2006.01)

(52) U.S. Cl.
USPC .................. 359/10; 359/11; 359/22; 359/28; 359/245; 359/276; 359/278; 359/279; 359/285; 359/290; 359/291; 359/292; 359/295; 359/298; 359/315; 359/316; 359/626; 359/621; 345/87; 345/89; 345/90; 345/100; 345/108; 385/28; 385/31; 385/34; 385/36; 385/116; 385/119; 349/5; 349/8; 349/11; 349/15; 349/16; 349/17; 349/57; 349/62; 349/95; 349/100; 349/158; 349/162; 349/201; 349/202

(58) Field of Classification Search .............. 349/15–17, 349/57, 62, 95, 100, 158, 159, 162, 201, 349/202, 5, 8, 11; 359/10, 11, 22–26, 28, 359/245, 276–279, 285–287, 290–292, 295, 359/298, 315, 316, 626, 621; 345/87, 89, 345/90, 100, 108; 385/28, 31, 34, 36, 116, 385/119
See application file for complete search history.

(56) References Cited

U.S. PATENT DOCUMENTS 4,874,227 A 10/1989 Matsukawa et al.
5,078,475 A 1/1992 Sekimura et al.
(Continued)

FOREIGN PATENT DOCUMENTS

EP 0 526 784 A2 2/1993
EP 1 217 421 A2 6/2002
(Continued)

OTHER PUBLICATIONS

International Search Report, dated Jan. 29, 2010, issued in priority International Application No. PCT/EP2008/064083.
(Continued)

*Primary Examiner* — Evelyn A. Lester
(74) *Attorney, Agent, or Firm* — Saul Ewing LLP

(57) ABSTRACT

The present invention relates to a light modulating device, comprising a SLM and a pixelated optical element, in which a group of at least two adjacent pixels of the SLM in combination with a corresponding group of pixels in the pixelated optical element form a macropixel, the pixelated optical element being of a type such that its pixels comprise a fixed content, each macropixel being used to represent a numerical value which is manifested physically by the states of the pixels of the SLM and the content of the pixels of the pixelated optical element which form the macropixel.

49 Claims, 19 Drawing Sheets

U.S. PATENT DOCUMENTS

| | | | |
|---|---|---|---|
| 5,312,513 A | | 5/1994 | Florence et al. |
| 5,506,701 A | | 4/1996 | Ichikawa |
| 5,539,543 A | * | 7/1996 | Liu et al. .................. 359/15 |
| 5,543,870 A | | 8/1996 | Blanchard |
| 6,359,719 B1 | | 3/2002 | Ori |
| 6,654,156 B1 | * | 11/2003 | Crossland et al. ............ 359/290 |
| 7,733,557 B2 | * | 6/2010 | Handschy et al. ............... 359/11 |
| 2006/0055994 A1 | | 3/2006 | Schwerdtner |
| 2006/0139710 A1 | | 6/2006 | Schwerdtner |
| 2006/0139711 A1 | | 6/2006 | Leister et al. |
| 2007/0109617 A1 | | 5/2007 | Cable et al. |
| 2008/0198430 A1 | * | 8/2008 | Schwerdtner et al. .......... 359/23 |

FOREIGN PATENT DOCUMENTS

| | | |
|---|---|---|
| JP | 63-85589 | 4/1988 |
| WO | WO 2004/031841 A2 | 4/2004 |
| WO | WO 2006/027228 A1 | 3/2006 |
| WO | WO 2006/066906 A1 | 6/2006 |
| WO | WO 2006/066919 A1 | 6/2006 |

OTHER PUBLICATIONS

Love and Bandari, Optics Communications, vol. 110, 475-478 (1994).

Wilkinson et al., "Dynamic Asymmetric Binary Holograms Using a Ferroelectric Liquid Crystal Spatial Light Modulator," Optics Communications, vol. 109, No. 3/04, pp. 222-226 (Jul. 1, 1994).

* cited by examiner

FIGURE 1
FIGURE 1A
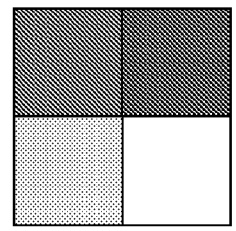
FIGURE 1B
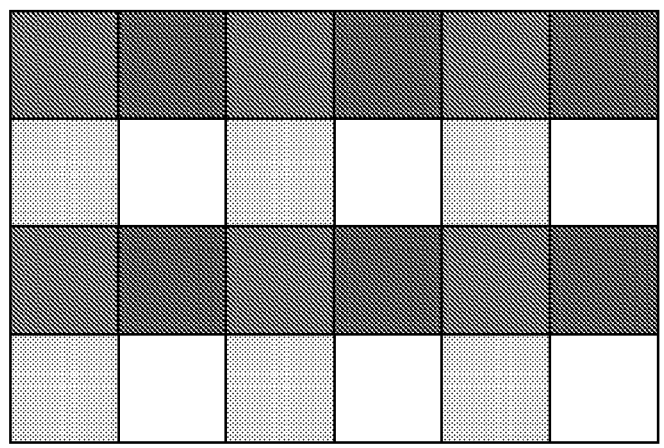
FIGURE 1C
FIGURE 1D
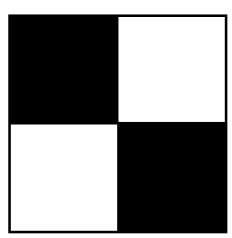
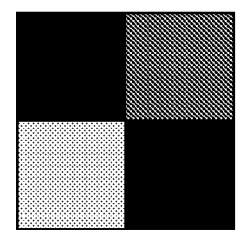

FIGURE 2
FIGURE 2A
| 0 | π/2 |
|---|---|
| π | 3π/2 |
FIGURE 2B
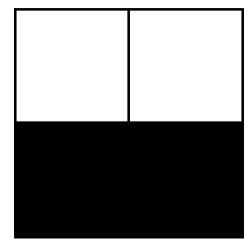
FIGURE 2C
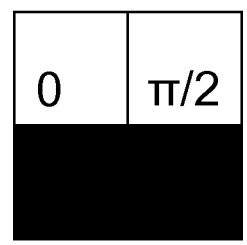

| 0 | π/4 |
|---|---|
| π/2 | 3π/4 |

FIGURE 4B

| 0 | 0 |
|---|---|
| π | π |

FIGURE 4C

| 0 | π/4 |
|---|---|
| 3π/2 | 7π/4 |

| 0 | π/2 |
|---|---|
| π | 3π/2 |

FIGURE 6B

| 0 | 0 |
|---|---|
| π/4 | π/4 |

FIGURE 6C

| 0 | π/2 |
|---|---|
| 5π/4 | 7π/4 |

FIGURE 8
FIGURE 8A
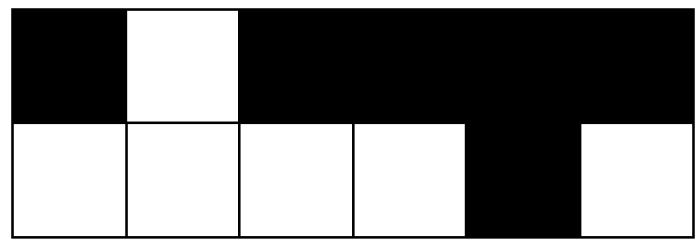
FIGURE 8B
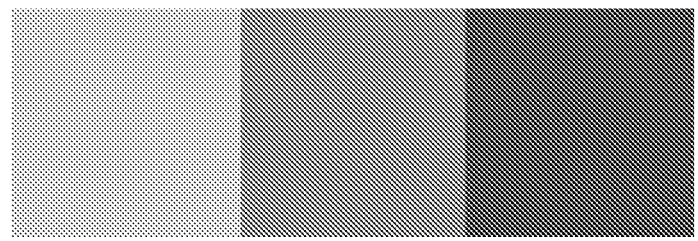
FIGURE 8C
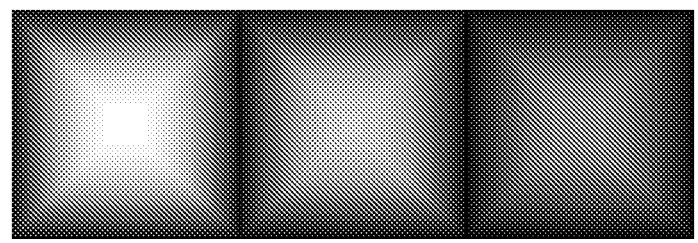

1 input macropixel
2 rod
3 light ray
4 homogenized light output of rod

FIGURE 10
FIGURE 10A
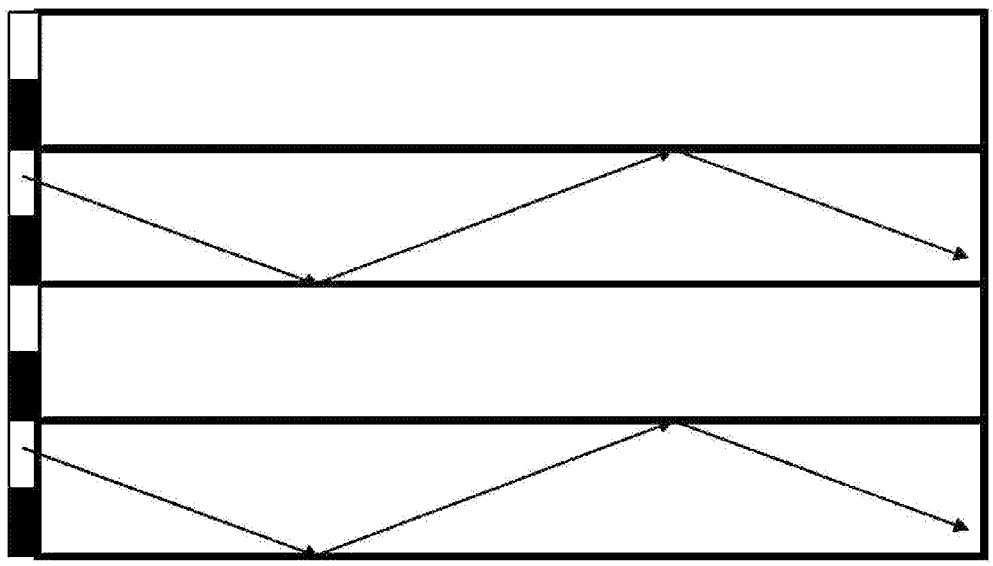
side view
FIGURE 10B
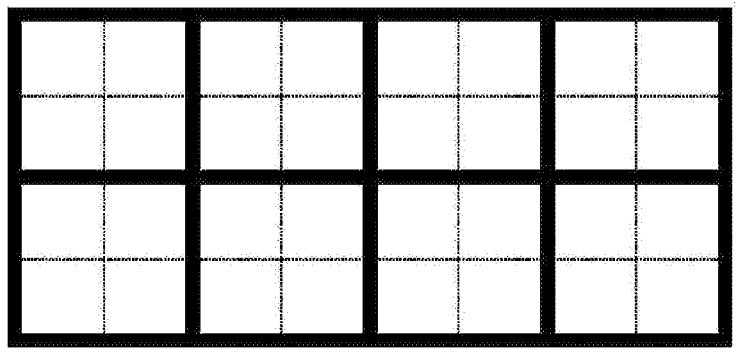
top view 1 input macropixel
5 fiber coupler – fan in
4 homogenized light output of fiber coupler

FIGURE 12

For Liquid/Gas Filter, Differential Pressure Pumping,
Orifice for Mass Spectroscopy, Light/X-ray Collimator

FEATURES
- Uniform capillary diameter
- Possible to make liquid laminar flow
- Possible to give charche particle or molecule directivity
- Good mechanical strength
- High heat resistance (430°C Max.)
- Possible to collimate light

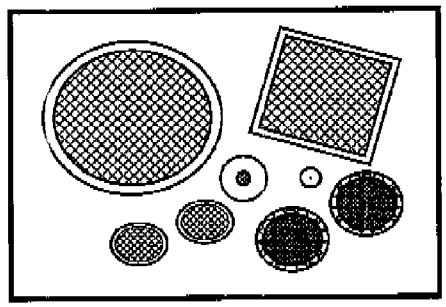

Capillary plate is a circular or rectangular plate where glass capillaries of channel diameter 6 to 25 μm are regularly bundled in parallel. Depending on its channel diameter or thickness, capillary plate can control flow speed or flow quantity of gas or liquid and can be used as a gas filter or a window material for differential pressure pumping. Besides it can give directivity to charged particle and molecule, and can be also used as a light or X-ray collimator. Our capillary plate has as high as over 55 % open area ratio.

DIMENSIONAL OUTLINES AND SPECIFICATIONS (UNIT: mm)

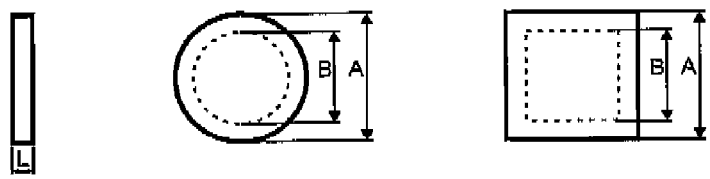

| Type No. | Size A | Effective Area B (mm) | Channel Diameter D (μm) | Thickness L (mm) | L/D |
|---|---|---|---|---|---|
| J5022-01 | ⌀ 5 | ⌀ 0.8 | 12 | 1.0 | 83 |
| J5022-09 | ⌀ 25 | ⌀ 20 | 6 | 1.0 | 167 |
| J5022-11 | ⌀ 25 | ⌀ 20 | 10 | 0.4 | 40 |
| J5022-16 | ⌀ 33 | ⌀ 27 | 10 | 1.0 | 100 |
| J5022-21 | ⌀ 87 | ⌀ 77 | 25 | 1.0 | 40 |
| J5022-19 | 60 x 60 | 53 x 53 | 20 | 1.0 | 50 |

Step 1:
Exposure by way of
two-beam
interference

Diffraction image
of the two-beam
interference

Areal section with higher
diffraction order

Step 2:
Turning by 90°
and second exposure
by way of two-beam
interference

FIGURE 16
FIGURE 16A
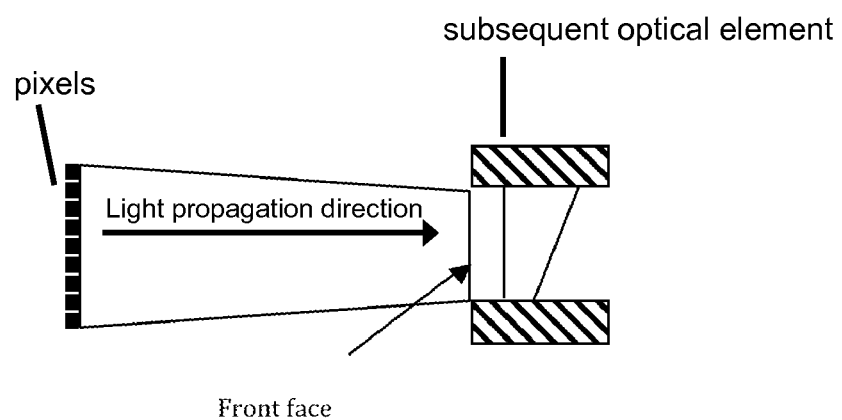
FIGURE 16B
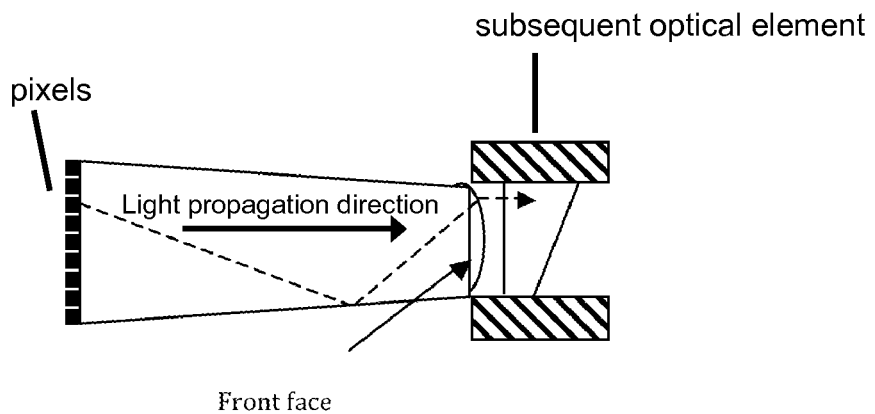

LIGHT MODULATING DEVICE

CROSS REFERENCE TO RELATED APPLICATIONS

This application claims the priority of PCT/EP2008/064083, filed on Oct. 20, 2008, which claims priority to Great Britain Application No. 0720483.7, filed Oct. 19, 2007, and EPO Application No. 08160789.7, filed on Jul. 21, 2007, the entire contents of which are hereby incorporated in total by reference.

BACKGROUND OF THE INVENTION

1. Field of the Invention

The invention relates to the field of light modulating devices, especially to light modulating devices used in holographic displays.

2. Technical Background

Computer-generated video holograms (CGHs) are encoded in one or more spatial light modulators (SLMs); the SLMs may include electrically or optically controllable cells. The cells modulate the amplitude and/or phase of light by encoding hologram values corresponding to a video-hologram. The CGH may be calculated e.g. by coherent ray tracing, by simulating the interference between light reflected by the scene and a reference wave, or by Fourier or Fresnel transforms; CGH calculation methods are described for example in US2006/055994 and in US2006/139710, which are incorporated by reference. An ideal SLM would be capable of representing arbitrary complex-valued numbers, i.e. of separately controlling the amplitude and the phase of an incoming light wave. However, a typical SLM controls only one property, either amplitude or phase, with the undesirable side effect of also affecting the other property. There are different ways to spatially modulate the light in amplitude or phase, e.g. electrically addressed liquid crystal SLM, optically addressed liquid crystal SLM, magneto-optical SLM, micro mirror devices or acousto-optic modulators. The modulation of the light may be spatially continuous or composed of individually addressable cells, one-dimensionally or two-dimensionally arranged, binary, multi-level or continuous.

In the present document, the term "encoding" denotes the way in which regions of a spatial light modulator are supplied with control values to encode a hologram so that a 3D-scene can be reconstructed from the SLM.

In contrast to purely auto-stereoscopic displays, with video holograms an observer sees an optical reconstruction of a light wave front of a three-dimensional scene. The 3D-scene is reconstructed in a space that stretches between the eyes of an observer and the spatial light modulator (SLM), or possibly even behind the SLM. The SLM can also be encoded with video holograms such that the observer sees objects of a reconstructed three-dimensional scene in front of the SLM and other objects on or behind the SLM.

The cells of the spatial light modulator may be transmissive cells which are passed through by light, the rays of which are capable of generating interference at least at a defined position and over a spatial coherence length of a few millimeters. This allows holographic reconstruction with an adequate resolution in at least one dimension. This kind of light will be referred to as 'sufficiently coherent light'.

In order to ensure sufficient temporal coherence, the spectrum of the light emitted by the light source must be limited to an adequately narrow wavelength range, i.e. it must be near-monochromatic. The spectral bandwidth of high-brightness LEDs is sufficiently narrow to ensure temporal coherence for holographic reconstruction. The diffraction angle at the SLM is proportional to the wavelength, which means that only a monochromatic source will lead to a sharp reconstruction of object points. A broadened spectrum will lead to broadened object points and smeared object reconstructions. The spectrum of a laser source can be regarded as monochromatic. The spectral line width of a LED is sufficiently narrow to facilitate good reconstructions.

Spatial coherence relates to the lateral extent of the light source. Conventional light sources, like LEDs or Cold Cathode Fluorescent Lamps (CCFLs), can also meet these requirements if they radiate light through an adequately narrow aperture. Light from a laser source can be regarded as emanating from a point source within diffraction limits and, depending on the modal purity, leads to a sharp reconstruction of the object, i.e. each object point is reconstructed as a point within diffraction limits.

Light from a spatially incoherent source is laterally extended and causes a smearing of the reconstructed object. The amount of smearing is given by the broadened size of an object point reconstructed at a given position. In order to use a spatially incoherent source for hologram reconstruction, a trade-off has to be found between brightness and limiting the lateral extent of the source with an aperture. The smaller the light source, the better is its spatial coherence.

A line light source can be considered to be a point light source if seen from a right angle to its longitudinal extension. Light waves can thus propagate coherently in that direction, but incoherently in all other directions.

In general, a hologram reconstructs a scene holographically by coherent superposition of waves in the horizontal and the vertical directions. Such a video hologram is called a full-parallax hologram. The reconstructed object can be viewed with motion parallax in the horizontal and the vertical directions, like a real object. However, a large viewing angle requires high resolution in both the horizontal and the vertical direction of the SLM.

Often, the requirements on the SLM are lessened by restriction to a horizontal-parallax-only (HPO) hologram. The holographic reconstruction takes place only in the horizontal direction, whereas there is no holographic reconstruction in the vertical direction. This results in a reconstructed object with horizontal motion parallax. The perspective view does not change upon vertical motion. A HPO hologram requires less resolution of the SLM in the vertical direction than a full-parallax hologram. A vertical-parallax-only (VPO) hologram is also possible but uncommon. The holographic reconstruction occurs only in the vertical direction and results in a reconstructed object with vertical motion parallax. There is no motion parallax in the horizontal direction. The different perspective views for the left eye and right eye have to be created separately.

A computer-generated hologram may be represented as an array of complex numbers. A device for reconstruction of such a hologram has to include one component which is a medium for displaying the hologram data. Writing the data onto the medium may be done either once as in the case of a fixed holographic optical element, for example in lithographic structures, or as a function of time as in the case of addressable structures, which allow one to display time-varying content.

In this document the term 'pixelated optical element' or 'diffractive element' is used for a medium with fixed content; the term 'spatial light modulator' (SLM) is used for a medium with addressable time-variable content, which may be re-written as a function of time. In a more general manner what is described in this document by means of hologram data also holds for other tasks where either a fixed or a variable medium can be used for some kind of light modulation. In this document the term light modulation element is used for a fixed element, or for a variable element or for a combination of both types of element.

Light modulating elements may be either transmissive or reflective. In this document the term transmission may be used—in a more general manner—such that it also refers to reflection in the case of a reflective display or as an interaction between the optical element and the light.

SLM or diffractive elements may be either transmissive or reflective. In this document the term transmission may be used in a more general manner—such that it also refers to reflection in the case of a reflective display or as an interaction between the SLM or diffractive elements and the light.

There exist SLMs (i.e. variable light modulators) with a fixed intrinsic pixel structure and other types of SLM where this does not hold: for example, optically addressable SLMs. Where the following description refers to a pixelated SLM it also includes such types of SLM which do not have an intrinsic pixel structure, but on which some kind of grid pattern similar to a pixel structure can be achieved by the writing process.

For writing of holographic data, many combinations of SLMs and diffractive elements may be used, ranging from a single SLM and a single diffractive element, up to a combination of several SLM and several diffractive elements, any given combination being able to display complex numbers. However it is also possible that each single complex number of an array of hologram data may be represented by a single pixel or by a group of usually adjacent amplitude and/or phase pixels in either an SLM or in a diffractive element.

Each pixel of the SLM/diffractive element usually is able to display only a limited number of different values. For these values the term "quantization steps" is used. For example a common amplitude SLM has 256 quantization steps.

When writing the hologram data onto the SLM/diffractive element a quantization of the hologram data is necessary. For example a rounding of hologram data values to the quantization steps of the SLM/diffractive element should take place. For a hologram, this quantization may result in deviations from the desired hologram reconstruction. These errors may be small and tolerable in the case of a large number of quantization steps but they become more significant and may be not tolerable in the case where only a small number of quantization steps exist. The number of quantization steps needed may vary depending on other parameters of the application.

Some types of SLM are binary which means they have only 2 quantization steps i.e. they have only 0 (zero) and 1 (one) states. Examples are ferroelectric liquid crystal (FLC) SLMs or micromirror arrays. There exist also other types of SLM with more than 2 but still relatively few quantization steps, for example ternary SLMs with 3 quantization steps.

FLC SLM may be configured either as amplitude or as phase SLMs. A configuration suitable for use as phase SLMs is described in G. D. Love, and R. Bandari, Optics Communications, Vol. 110, 475-478, (1994). Also micromirror arrays may be configured either as amplitude SLMs—for example by use of micromirror tilt, or as phase SLMs—for example by use of micromirror pistons.

SLMs with only a few quantization steps may have advantages, for example fast switching times which allow high frame rates, which make their use desirable.

3. Discussion of Related Art

WO 2004/044659 (US2006/0055994) filed by the applicant and incorporated by reference describes a device for reconstructing three-dimensional scenes by way of diffraction of sufficiently coherent light; the device includes a point light source or line light source, a lens for focusing the light and a spatial light modulator. In contrast to conventional holographic displays, the SLM in transmission mode reconstructs a 3D-scene in at least one 'virtual observer window' (see Appendix I and II for a discussion of this term and the related technology). Each virtual observer window is situated near the observer's eyes and is restricted in size so that the virtual observer windows are situated in a single diffraction order, so that each eye sees the complete reconstruction of the three-dimensional scene in a frustum-shaped reconstruction space, which stretches between the SLM surface and the virtual observer window. To allow a holographic reconstruction free of disturbance, the virtual observer window size must not exceed the periodicity interval of one diffraction order of the reconstruction. However, it must be at least large enough to enable a viewer to see the entire reconstruction of the 3D-scene through the window(s). The other eye can see through the same virtual observer window, or is assigned a second virtual observer window, which is accordingly created by a second light source. Here, a visibility region i.e. the range of positions from which an observer can see a correct reconstruction, which would be rather large, is limited to the locally positioned virtual observer windows. This virtual observer window solution uses the larger area and high resolution of a conventional SLM surface to generate a reconstruction which is viewed from a smaller area which is the size of the virtual observer windows. This leads to the effect that the diffraction angles, which are small due to geometrical reasons, and the resolution of current generation SLMs, are sufficient to achieve a high-quality real-time holographic reconstruction using reasonable, consumer level computing equipment.

In WO 2004/044659 (US2006/0055994) and in some other patent applications of the applicant (e.g. WO 2006/066919, WO 2006/027228 or WO 2006/066906), a method and device for reconstructing holograms is described, where a reconstruction of a three dimensional (3D) scene can be seen from within a virtual observer window. The observer window may have approximately the size of one eye. One example of such a device—suitable for more than one observer—includes a time sequential generation of the observer windows for each observer as well as for the right and the left eye of each observer. For such an implementation it would be desirable to use as one element of the device a fast switching SLM.

In general there may be other types of holograms and holographic displays, different from the type described in WO 2004/044659 (US2006/0055994) for which fast switching SLMs are also advantageous.

In standard (i.e. non holographic) use as amplitude displays, binary SLM make use of a method called 'pulse width modulation' where grey values are emulated by time average over several on and off cycles of binary states. This method is usually not applicable for holographic use, because modulation of coherent light—needed for a hologram reconstruction—can only be obtained from those hologram data displayed at the same time.

Diffractive elements may also exist in a binary form, or with a larger number of quantization steps. For example, state of the art phase elements can be manufactured with 64 quantization steps or even more. For amplitude diffractive elements there is the possibility to make use of grey scale lithography in order to obtain non-binary elements. Also there exist special glass materials through which transmission can be varied continuously.

For reducing quantization errors in binary diffractive elements there exist iterative calculation methods. But these require high calculation effort and for this reason and other reasons such calculation methods may not be suitable for fast calculation of variable hologram content to be displayed with an SLM.

For binary amplitude SLMs or binary diffractive amplitude elements it is known that several adjacent pixels may be combined to form a macropixel in order to emulate grey levels. By switching on a different number of binary pixels the total transmittance of the macropixel is changed. This works similarly to half tone printing. A disadvantage of this method is the fact that with a macropixel composed of N individual binary pixels it is only possible to obtain N+1 grey values.

In the patent application US20070109617 a combination of a pixelated SLM with a pixelated phase mask diffractive element is described, where the phase mask has a higher resolution (i.e. a smaller pixel size) compared to the SLM. Each pixel of the SLM is in its effect on hologram reconstruction combined with several pixels of the phase mask. The aim of US20070109617 is to increase the useable diffraction angle. But this leads to the disadvantage of a higher noise level.

SUMMARY OF THE INVENTION

According to the invention, a light modulating device comprises a SLM and a pixelated optical element. In the light modulating device a group of at least two adjacent pixels of the SLM in combination with a corresponding group of pixels in the pixelated optical element form a macropixel. The pixelated optical element is of a type such that its pixels comprise a fixed content or not a variable characteristic. The SLM is of a type such that its pixels comprise a variable content. Each macropixel is used to represent a numerical value which is manifested physically by the states of the pixels of the SLM and the content or states of the pixels of the pixelated optical element which form the macropixel. It is intended that the numerical values of all macropixels can be set in such a way as to modulate an incoming light wavefront in a predetermined manner by the use of the physical manifestation of the macropixels.

The SLM could be of a type such that its pixels are adjustable to different values of a limited number of possible discrete values, the number of values being $\geq 2$. The SLM could comprise k different values of a limited number of possible discrete values or quantization levels and a macropixel has N pixels, k and N being natural numbers. Preferably, k and N do not have the same value. The SLM could be of a type such that its pixels are adjustable to different values within a continuous range of possible values.

The SLM could be of a type such that its pixels are adjustable to modulate or alter the amplitude of the light interacting with the SLM. In particular, the pixels of the SLM could be adjustable only between two different amplitude values, especially to adjust the amplitude of the light interacting with the SLM to a minimum or to a maximum value, especially to 0% or to 100%. Alternatively, the SLM could be of a type such that its pixels are adjustable to modulate the phase of the light interacting with the SLM. In particular, the pixels of the SLM could be adjustable only between two different phase values, especially between the values 0 and $\pi$ or between the values 0 and $\pi/2$ or between the values 0 and $\pi/4$.

The SLM could comprise a micromirror unit, the individual mirrors of the micromirror unit comprise layers with a characteristic suitable to modulate the phase and/or the amplitude of the light interacting with the micromirror unit. Alternatively or additionally, the SLM could comprises a micromirror unit, the pixelated optical element being implemented into the micromirror unit by lowering the maximum reflectivity of individual mirrors of each macropixel down to different predetermined values and/or to generate a fixed offset of the individual mirrors of each macropixel in their height or distance from the substrate which corresponds to a predetermined phase offset between individual pixels. In other words, the pixelated optical element could be integrated into the mirrors of the micromirror unit.

The SLM could comprise a ferroelectric liquid crystal (FLC SLM).

The number of accessible states for each macropixel could be greater than the number of states accessible by the group of pixels of each SLM of the macropixel. Alternatively, the number of accessible states for each macropixel could be greater that the number of the fixed states of the group of pixels of the pixelated optical element, especially when the device is in use.

The pixelated optical element could comprise a diffractive element.

Several individual pixels of the SLM and/or of the pixelated optical element being used as parts of a macropixel could comprise different sizes and/or shapes or could comprise differences in some other characteristic.

The pixelated optical element could be of a type such that its pixels comprise different modulation values of a limited possible modulation number of discrete values, the number of modulation values being $\geq 2$. The pixelated optical element could be of a type such that its pixels are adjustable to modulate or alter the amplitude and/or the phase of the light interacting with the pixelated optical element. For example, the pixels of the pixelated optical element could comprise at least two different grey scale values for modulating the amplitude of the light interacting with the pixelated optical element.

In a preferred embodiment, a pixel of the pixelated optical element could comprise an optical medium having a predetermined optical pathlength for modulating the phase of the light interacting with this pixel depending on the predetermined optical pathlength. Alternatively or additionally, a pixel of the pixelated optical element could comprise an optical medium having a predetermined absorption or reflection for modulating the amplitude of the light interacting with this pixel depending on the predetermined absorption or reflection.

A pixel of the pixelated optical element could be provided as an element inside the substrate glass of the SLM—preferably located adjacent or near the LC layer—for modulating the phase of the light interacting with the pixel of the pixelated optical element. Alternatively or additionally, a pixel of the pixelated optical element could be provided as an element inside the LC substrate glass of the SLM for modulating the amplitude of the light interacting with the pixel of the pixelated optical element.

The pixels of the pixelated optical element each could be composed of units being of a smaller size than the size of the pixels of the SLM. Therefore, each SLM pixel can have a pixelated phase distribution.

The pixelated optical element could be located in front of or behind the SLM with respect to the propagation of light interacting with the light modulating device.

Each pixel of the SLM could be allocated to exactly one pixel of the pixelated optical element. Groups of at least two adjacent pixels of the SLM in combination with the corresponding groups of—preferably adjacent—allocated pixels of the pixelated optical element could be used to form each macropixel. Different macropixels of the pixelated optical element could have different structures or content. Different macropixels could comprise a different number of single pixels of the SLM and/or of the pixelated optical element.

A pixelated optical element being adapted to modulate the amplitude of the light interacting with the pixelated optical element could be combined with a SLM being adapted to modulate the—preferably discrete—amplitude or phase of the light interacting with the SLM. The individual pixels could comprise greyscale values, preferably nonlinear greyscale values, preferably without a common factor. This gives a maximum of combinations and thus a maximum of values which can be generated by the macropixel redundance-free. This is also valid for the combination of binary phase shifting pixels and fixed binary phase values.

A pixelated optical element being adapted to modulate the phase of the light interacting with the pixelated optical element could be combined with a SLM being adapted to modulate the amplitude of the light interacting with the SLM. At least one pixel of the pixelated optical element of a macropixel could comprise a phase value different to the phase values of the other pixels of the pixelated optical element of the macropixel. The pixels of the SLM and/or of the pixelated optical element could be adapted such that the possible complex output values—especially of neighbouring pixels—result in essentially the same spacing either in the real or in the imaginary direction in the complex plane. The macropixel could be adapted such that it generates the point (0+0i) in the complex plane.

A pixelated optical element adapted to modulate the phase of the light interacting with the pixelated optical element could be combined with a SLM being adapted to modulate the—preferably discrete—phase of the light interacting with the SLM.

The macropixels could be adapted to encode phase values and/or amplitude values. At least two macropixels could be combined to form a larger unit.

Single pixels of the SLM could not be set to a switch off state during the operation of the light modulating device.

A macropixel could consist of individual pixels of different sizes, the macropixel being encoded such that the individual terms in the electric field sum are weighted with additional amplitude factors corresponding to their size or factor of contribution to the value which is generated at the output plane of the macropixel.

A predetermined value to be represented by a macropixel could be transferred by a transferring means, e.g. at least one data line, from an external source where the predetermined value has been calculated, and wherein the switching state of the individual pixels inside a macropixel is determined locally in the local region encompassing the macropixel.

For each macropixel a homogenizing element could be present in the optical path after the macropixel, the homogenizing element comprising an optical input and an optical output, the homogenizing element being adapted such that output light of the macropixel is entering the optical input of the homogenizing element and is mixed within the homogenizing element and is output at the optical output of the homogenizing element. The optical input of a homogenizing element could comprise at least one input aperture and/or wherein the optical output of a homogenizing element comprises an output aperture.

The homogenizing element could be adapted to generate output light comprising a characteristic being essentially equivalent to the light output of one homogeneous pixel.

The homogenizing element could be adapted to generate output light with a predetermined amplitude and/or phase variation over the output aperture of the homogenizing element.

The output apertures of the homogenizing elements could comprise essentially the same size and/or form. The homogenizing element could comprise a common input aperture for all pixels of a macropixel. The homogenizing element could comprise at least two separated input apertures for the pixels of a macropixel. The size of the output aperture of the homogenizing element could be approximately equal to the size of a macropixel.

A homogenizing element could comprise a rod or an integrator rod for achieving a macropixel homogenisation, where the integrator rod comprises dimensions being adapted to the dimensions being typical for macropixel structures.

An array of rods could be provided, a rod of the array being assigned to a macropixel. A rod array could be integrated into one single mechanical element, the mechanical element preferably comprising at least one air gap between the rods in the rod array. For rods in the rod array, the core of the rod could comprise a higher refractive index than the refractive index of the cladding of the rod.

A very thin LC SLM substrate glass could be compounded with a rod array substrate.

Wet chemical etching or plasma etching could be applied for fabricating at least one rod array.

A rod array could be integrated into a SLM substrate plate, the refractive index of the substrate plate is modulated periodically consistent with the dimensions of the rod array in order to implement cores and claddings of the rod array. This results in a Light guiding Fiber Optic Faceplate with a guiding channel pitch equivalent to the pitch of the macro pixel array. The core comprises a high refractive n, the cladding comprises a low refractive index n.

A homogenizing element could comprise a capillary plate for achieving a macropixel homogenisation.

A matrix arrangement of light pipes could be generated by writing into an optical medium in a targeted manner by way of optical exposure causing a difference in the refractive index of the optical medium, especially into an optically polymerizable medium or into a photopolymer. Synchrotron radiation can be used to expose PMMA substrates and to take out holes which act as capillaries of a capillary plate. Also SU-8 and a top surface lithography process can be used to generate an array of capillaries. It is noted, that a matrix arrangement of light pipes is also denoted as an array of fibers, rods or capillaries. The optical medium could consist of a material which changes its refractive index when being irradiated with light of a certain wavelength.

A first line pattern could be generated into the optical medium by exposing or irradiating the optical medium by way of two-beam interference of two—especially plane—light beams comprising a predetermined wavelength and/or defined by the angle between the propagation directions of the two light beams. A second line pattern could be generated into the optical medium by exposing the optical medium by way of two-beam interference of two light beams again after either the optical medium or the light sources have been turned by a predefined angle, preferably 90°, about an axis perpendicular to the plane or surface of the exposed medium.

The optical medium could be exposed by way of direct scanning using masks, wherein a mask preferably comprises of a set of light transmitting apertures, each aperture corresponding to the body of a light pipe.

A matrix arrangement of light pipes could be generated by illuminating a silver halide film with an interference pattern. This illumination could be generated by a two or four beam interference. Then the silver halide film could be developed. This creates absorbing side walls. Preferably a chemical solution could be applied to the silver halide film in order to metalized the absorbing sidewalls consisting of small sized Ag particles and thus making compact silver side walls. Small sized metal particles with a low density act as an absorber. If the density is increased and a metallization process is used, than the absorbing sidewalls are transformed into reflecting side walls.

A glass plate with periodic holes in one-to-one correspondence with a macropixel grid could be used to homogenize light.

"Lithography galvano forming" (LIGA) could be applied to generate metallic structures with high aspect ratios for light homogenization or for a replication master which is used to generate said light guiding structures.

The optical input of the homogenizing element could comprise an array of optical fibre fan-in elements, the optical fibre fan-in elements being adapted to combine light coming from several pixels of a macropixel into the optical output of the homogenizing element.

The homogenizing element could comprise a fiber optic face plate including an array of fan-in elements, the array of fan-in elements being combined with a LC-SLM such that there is one fiber for each pixel of the light modulating element and at the output there is one fiber for each macropixel.

The homogenizing elements could be used for mixing the signals of phase pixels or complex pixels including phase information, such that the mean optical path length through the element is the same for each individual pixel of the macropixel or is chosen to generate a preferred phase offset (which might be equivalent to the individual fixed phase offsets described above). It is preferred to have an intensity distribution of each individual subpixel—this means the substructure which combines fixed offset value and dynamic binary value—which is homogeneous at the exit surface of the combining and/or homogenizing element and which is equivalent for each subpixel.

The values of the individual pixels of a macropixel could be calculated in such a way as to compensate for non-ideal effects or errors of the homogenizing element.

The relation of input states of individual SLM pixels in the macropixel to the output states of the homogenizing element could be listed or stored in a look-up table and for a desired/predefined output state the combination of input pixel values that fit best to this output state are chosen and are written to the pixels of the SLM. This might compensate for fabrication errors in a way to realize the desired values for the combination of the dynamic values and the static values of the subpixels.

The homogenizing element could be adapted to generate predetermined optical path lengths for light of each individual pixel in a macropixel, the predetermined optical path lengths preferably being different.

In a fan-in fiber coupler the length or the refractive index of individual fibers in the fiber segment before coupling them to a larger fiber could be chosen to be different to each other such that different optical paths of individual pixels are compensated for or induced.

A scatter means could be implemented at or near the optical input of the homogenizing elements, especially at or near an entrance plane of the homogenizing elements being realized by light pipes.

In a holographic display according to the claimed invention, the scatter means could be designed such that a suppression of higher diffraction orders in the plane of a virtual observer window (VOW) of a holographic display is achieved.

The scatter means could be designed such that a predicted or desired intensity distribution and/or angular emission of the light emitting or passing the macropixel can be achieved.

A scatter means could be implemented at or near the exit plane of the homogenizing elements, especially of the light pipe.

A phase profile element could be implemented near to or at the exit plane of the SLM.

The light modulating device could further comprise a phase altering means being arranged downstream of the SLM with respect of the propagation of the light, the phase altering means being arranged between the SLM and the scatter means. The phase altering means could comprise a micro lens array or a structure being comparable to a micro lens array. The phase altering means could be operating on a diffractive basis. The phase altering means could be a diffractive binary surface profile or a graded index profile.

The scatter means could be arranged in a predetermined distance to the phase profile element or the phase altering means, the predetermined distance having a value between the range of 0.1 mm to 2 mm, the predetermined distance preferably being 0.5 mm.

According the invention, a method of modulating light being emitted by a coherent light source uses a light modulating device of the claimed invention.

In another aspect of the invention, a display device or a holographic display device comprises a light modulating device of the claimed invention.

In the display device, the light modulating device could be adapted to use at most one diffraction order and there is a low light intensity in other diffraction orders.

In the holographic display, at least one virtual observer window could be created at the eyes of one or more observers.

The extension of the virtual observer windows (VOW) (encoded diffraction order) could be determined to be equal to or smaller than ow=D$\lambda$/mp in holographic display, with D being the distance of an observer to the display, $\lambda$ being the wavelength of a light source as part of the holographic display and mp being the pitch of the macropixel grid.

In the holographic display, the light modulating device with a homogenizing element could be adapted to be operated such that undesirable eye crosstalk between the observer windows for both eyes of an observer compared to the use of the same light modulating device without homogenizing elements is reduced.

Binary optical elements—especially SLM and/or pixelated optical element—could be transformable into continuous level working elements (macropixels), or elements which have a greater number of levels than a binary state device.

According to still another aspect of the invention, a device for use in fast optical information transfer could comprise a light modulating device of the claimed invention, the device could further comprise at least one fast switching optical data array for an optical interconnect.

According to still another aspect of the invention, a method of obtaining a predetermined value C for a macropixel of a light modulating device of the claimed invention or for a holographic display of the claimed invention is provided. The method comprises the step of generating a value C to be encoded into a macropixel of the light modulating device by applying the equation $$C=a_1 \exp(ip_1)+a_2 \exp(ip_2)+a_3 \exp(ip_3)+\ldots+a_N \exp(ip_N),$$

where $a_j$ is one (out of the k) of the possible values of the amplitude of the SLM pixel j, j=1 to N, N being the number of the pixels of a macropixel of the SLM, and $p_j$ is the fixed phase value of pixel j of the pixelated optical element of the macropixel, and the method comprising the step of finding a set of possible values $a_j$ and/or $p_j$ to solve or approximate the equation.

According to still another aspect of the invention, a method of obtaining a predetermined value C for a macropixel of a light modulating device of the claimed invention or for a holographic display of the claimed invention is provided. The method comprises the step of generating a value C to be encoded into a macropixel of the light modulating device by applying the equation $$C = \exp i(p_1 + sl_1) + \exp i(p_2 + sl_2) + \exp i(p_3 + sl_3) + \ldots + \exp i(p_N + sl_N)$$

where the $p_j$ is the fixed phase value of pixel j of the pixelated optical element of the macropixel, j=1 to N, N being the number of the pixels of a macropixel of the SLM, and the $sl_j$ is one of the possible values representing a switchable phase value (to one out of k states) of the SLM pixel j, and the method comprising the step of finding a set of possible values $sl_j$ and/or $p_j$ to solve or approximate the equation.

The values C could be generated such that a predetermined dense and uniform distribution set of possible states in the complex plane is generated. Alternatively, for a SLM with a fixed set of possible values $a_j$ for the amplitude of a single pixel or $sl_j$ for the phase of a single pixel the values $p_j$, j=1 to N, of the pixelated optical element could be determined such as to generate a dense and uniform distribution set of possible states C in the complex plane.

The values C could be generated such that the number of degenerate states is relatively low, or zero. The values $p_j$, j=1 to N of the pixelated optical element could be determined such that the number of degenerate states that means different combinations of $a_j$ or $sl_j$ leading to the same complex value C, is relatively low, or zero, wherein in a degenerate state different combinations of $a_j$ or $sl_j$ lead to the same complex value C.

The number of the possible different complex values $C_m$ which can be generated could be $2^N$.

The step size of the binary SLM could be a further variable to be found. The step size of the binary SLM especially means the difference in phase between the two possible phase states $sl_j$ in a phase SLM. The difference in amplitude between two possible amplitude states $a_j$ in an amplitude SLM could be a further variable to be optimized in order to generate a dense and uniform distribution of complex values $C_m$.

Furthermore, this document describes multiple implementations. Appendix III lists them.

BRIEF DESCRIPTION OF THE DRAWINGS

FIG. 1 is a schematic diagram of the combination of an amplitude SLM with a diffractive amplitude element. FIG. 1A: example for a group of pixels of a diffractive amplitude element that make up one macropixel. FIG. 1B: six—in this case identical—macropixels (each 2 by 2 pixels) of the diffractive element. FIG. 1C: one possible switching state of a macropixel of a binary amplitude SLM. FIG. 1D: combined macropixel from the amplitude element of FIG. 1A and the switching state of the SLM of FIG. 1C.

FIG. 2 is a schematic diagram of the combination of an amplitude SLM with a diffractive phase element. FIG. 2A: example for a group of pixels of a phase element that make up one macropixel. FIG. 2B: possible switching state of a macropixel of a binary amplitude SLM. FIG. 2C: combined macropixel from the phase element of FIG. 2A and the switching state of the SLM of FIG. 2B.

FIG. 4 is a schematic diagram of the combination of a phase SLM with a diffractive phase element, the phase SLM pixels having possible states 0 and π. FIG. 4A: example of a group of pixels of a phase element that make up one macropixel. FIG. 4B: possible switching state of a macropixel of a binary phase SLM. FIG. 4C: combined macropixel from the phase element of FIG. 4A and the switching state of the SLM of FIG. 4B.

FIG. 6 is a schematic diagram of the combination of a phase SLM with a diffractive phase element, the phase SLM having possible states 0 and π/4. FIG. 6A: example for a group of pixels of a phase element that make up one macropixel. FIG. 6B: possible switching state of a macropixel of a binary phase SLM. FIG. 6C: combined macropixel from the phase element of FIG. 6A and the switching state of the SLM of FIG. 6B.

FIG. 8 shows the principle of macropixel homogenization, demonstrated with an amplitude macropixel as an example. FIG. 8A: 3 macropixels without homogenization. FIG. 8B: 3 macropixels with homogenization. FIG. 8C: 3 macropixels with a different kind of homogenization, including variation of the intensity over the macropixel.

FIG. 10 shows part of a rod array. FIG. 10A: side view. FIG. 10B: top view.

FIG. 12 shows some contents from a capillary plate product data sheet, supplied by Hamamatsus Photonics K.K. of Japan.

FIG. 16 FIG. 16A shows how the fill factor for the transmission can be improved by adapting the front face of the light pipe to the subsequent optical element. FIG. 16B shows how the arrangement of FIG. 16A may be improved by applying a curvature onto the front face.

DETAILED DESCRIPTION

Figure 3:
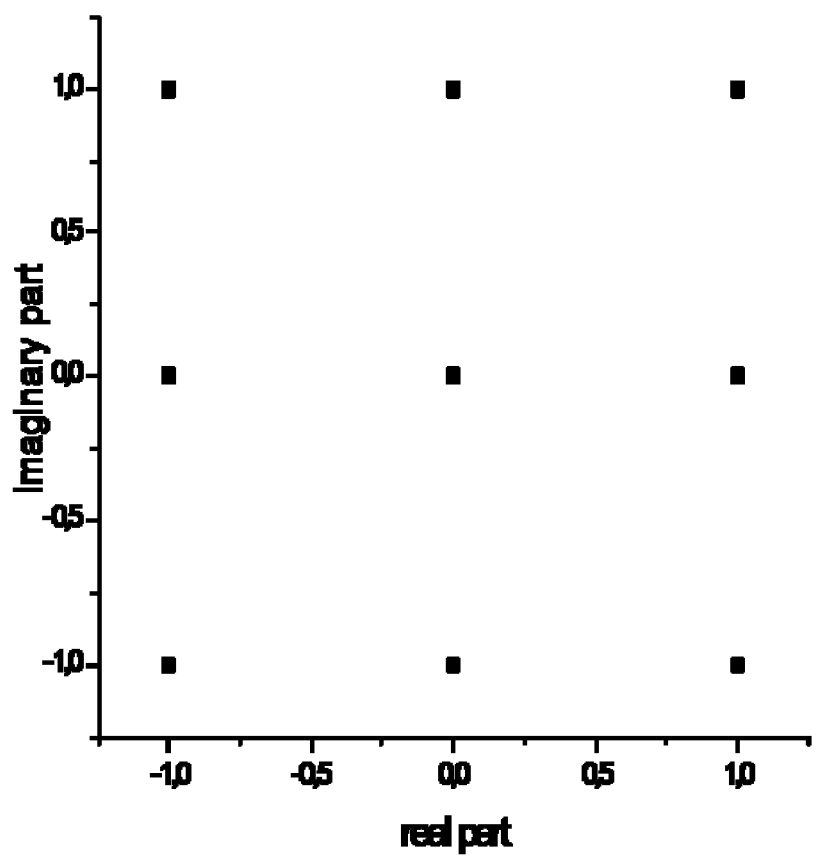
FIG. 3 shows the complex values that can be obtained by summing over the macropixel shown in FIG. 2, in the case where the phase values of the diffractive phase element are as shown in FIG. 2A.

Various implementations will now be described.

A. Macropixel as a Combination of an SLM and a Fixed Diffractive Element

The aim is make use of the advantages, for example fast switching times, of SLMs with relatively few quantization steps e.g. binary SLMs, for holographic reconstruction or for other more general light modulation tasks, but to do this in a way such that the disadvantage of these SLMs, i.e. the small number of quantization steps, is compensated for. The meaning of the term 'relatively few quantization steps' may depend on the particular setup and may include all cases where the effects of quantization on the result of light modulation may be improved upon to lead to higher quality holographic reconstruction.

In an example of an implementation, a combined light modulating device, such as a holographic display, is set up in the following manner a pixelated SLM—with addressable variable content—is combined with a pixelated diffractive element—with fixed content, where in the simplest case each pixel of the SLM is allocated to exactly one pixel of the diffractive element a group of more than one—usually adjacent—pixels of the SLM in combination with the group of allocated pixels of the diffractive element is used to form each macropixel with each macropixel one amplitude value or phase value or complex number is represented by the effect of a combination of the fixed state of the diffractive element and the values addressed to the SLM pixels which make up the macropixel.

The SLM and the diffractive element as well may be either amplitude or phase or complex valued elements such that several different combinations are possible.

As in common hologram encoding, several macropixels may be combined to form a larger unit. For example several amplitude macropixels may be combined in order to represent one complex number in an array of hologram data.

In the simplest case each macropixel of the diffractive element has an identical structure and content. In a more general case different macropixels of the diffractive element may have different structures or content.

In common SLM types, all pixels have the same size and shape such that several pixels with identical characteristics may be used as parts of a macropixel. In a more general case several individual pixels with different sizes and shapes or differences in some other characteristic may be used as parts of a macropixel. Within a given device, different macropixels may also include a different number of single pixels.

In a general case the pixels of the diffractive element may each be composed of smaller units, but with the restriction that for the combination with the SLM in its effect on light modulation, especially for hologram reconstruction, only the total state of the pixel of the diffractive element is directly relevant and not the individual states of the smaller units. This means for example one may have pixels of the diffractive element in a 4×4 array which form the diffractive element part of a macropixel. For instance, each pixel of the 4×4 array of pixels in the diffractive element can have its own fixed phase step, which could be 0, π, or π/4 and so on. This fixed part of a macro pixel, that means the 4×4 array of pixels of the diffractive element which have fixed phase steps is e.g. a surface relief grating, and this is also called a diffractive element. In addition to that, each pixel of the switchable part of the macropixel (i.e. the SLM) is able to generate two different phase values. These are the phase values which can be electronically controlled, which means this is the part which can be switched in a binary way.

This implementation is described in the following in more detail by means of several examples.

A first example is the combination of a diffractive grey scale amplitude element with a binary amplitude SLM. The pixels of the diffractive amplitude elements represent grey levels which means they have a defined transmission factor. At least one pixel in a group which makes up a macropixel must have a transmission factor different from the others. A preferred configuration is the use of nonlinear greyscale values in the individual pixels. An example is a macropixel composed of 4 individual pixels, where the diffractive element pixels each have relative amplitude transmission factors of $b_1=1$, $b_2=0.5$, $b_3=0.25$ and $b_4=0.125$.

With a combination of individual SLM pixels switched on or off, corresponding to diffractive element amplitude multiplied by either 1 or 0 respectively, it is possible to obtain for the macropixel (as a sum over 4 pixels) up to 16 quantization steps. More generally for a macropixel with N pixels, up to $2^N$ (2 to the power of N) greyscale values i.e. quantization steps can be achieved.

In the case of a binary SLM the total amplitude A of these N quantization steps can be calculated by the equation (1)

$$A=a_1b_1+a_2b_2+a_3b_3+\ldots+a_Nb_N \quad (1)$$

with $a_i$ the amplitudes of the SLM pixel being either 0 or 1, the $b_i$ being the amplitudes of the diffractive element pixels. The transmission is $A^2$, the square of the value of A. If A is complex, the transmission is the square modulus of A.

These $2^N$ different quantization steps are advantageous compared to the N+1 quantization steps of a state of the art macropixel without a diffractive element, as has been described above. The same or a similar example may also be useful for non-holographic applications. Non-holographic applications include fast laser or other coherent light source scanning within a TV, or TV back projection systems which use a laser scanning device, or which use another scanning device which scans coherent light.

FIG. 1 illustrates the first example by means of a macropixel made of 4 individual pixels. In this example all 4 pixels of the fixed amplitude element have different transmissions, as shown in FIG. 1A. FIG. 1B shows that in this case the amplitude element is composed of a periodical repetition of identical macropixels. In a more general manner there might also be a different setup of individual macropixels of a diffractive element. As shown in FIGS. 1C and 1D, by switching on or off individual pixels of the SLM there are in summation different total transmissions of the macropixel. FIG. 1C shows one possible switching state of a macropixel of a binary amplitude SLM. FIG. 1D shows the combined macropixel from the amplitude element of FIG. 1A and the switching state of the SLM of FIG. 1C.

In a second example, a diffractive phase element is combined with a binary amplitude SLM. In the diffractive phase element for each macropixel there has to be at least one pixel with a phase value different to the other pixels. For example for a macropixel composed of a group of 4 pixels, the pixel of the diffractive element may have the values 0, π/2, π and 3π/2. If only a single SLM pixel out of the four pixels would be switched on, four different phase states with fixed amplitude could be generated. A macropixel with N pixels may then act as a pure phase SLM with N phase values.

By switching on up to N SLM pixels in a macropixel, up to $2^N$ different combinations of complex values can be generated as the sum over all pixels of a macropixel, depending on the values in the phase elements and the amplitude states of the SLM pixel. With the SLM, any of the N pixels can be switched off, so as not to contribute to this sum.

The complex values are calculated as follows $$C = a_1 \exp(ip_1) + a_2 \exp(ip_2) + a_3 \exp(ip_3) + \ldots + a_N \exp(ip_N) \quad (2)$$

where $a_j$ is the amplitude of SLM pixel j and can take for example the value either 1 or 0, and $p_j$ is the fixed phase value of pixel j of a macropixel of the diffractive element.

FIG. 2 illustrates the second example by means of a macropixel made of 4 individual pixels. In FIG. 2A, all 4 pixels of the fixed phase element have different phases, as shown. By switching on or off individual pixels of the SLM the result is different complex values as sums over all pixels of the macropixel. FIG. 2A shows an example for a group of pixels of a phase element that makes up one macropixel. FIG. 2B shows a possible switching state of a macropixel of a binary amplitude SLM. FIG. 2C shows a combined macropixel resulting from the phase element of FIG. 2A and the switching state of the SLM of FIG. 2B. In the example in FIG. 2C, the complex value 1+i with an amplitude of the square root of two and a phase of $\pi/4$ results.

FIG. 3 illustrates the complex values that can be obtained with the setup shown in FIG. 2 for different possible settings of the SLM pixels. In this special case, where as shown in FIG. 2A the phase values 0, $\pi/2$, $\pi$ and $3\pi/2$ have been chosen for the fixed element, it is only possible to obtain 9 different complex values, because several combinations of switching states of the SLM pixels lead to the same summation result. This setup was chosen to illustrate what is described elsewhere in this document as an 'equally spaced grid' in the complex plane. Neighbouring values have the same spacing either in the real or in the imaginary direction. For other selections of the phase element pixel values, up to 16 different complex values would be possible.

In a third and preferred example of an implementation, a diffractive phase element is combined with a phase SLM. By summing up over values of the individual pixels of a macropixel a complex value is obtained. The switching of individual SLM pixels changes the total phase value of a combination of diffractive element and phase pixel. This leads also to a different result for the summation. Again, up to $2^N$ different complex values may result from a macropixel with N pixels. These values are given by $$C = \exp i(p_1 + sl_1) + \exp i(p_2 + sl_2) + \exp i(p_3 + sl_3) + \ldots + \exp i(p_N + sl_N) \quad (3)$$

where the $p_j$ are the fixed phase values of pixel j in a macropixel of the diffractive element, and the $sl_j$ are the switchable phase values of pixel j in a macropixel of the SLM.

For a binary SLM there are two phase values for each macropixel j, which may be for example 0 and $\pi$. A switching from 0 to $\pi$ leads to a change in sign of the corresponding element in the summation in Eq. (3).

Some kinds of SLM may not allow a full switching between 0 and $\pi$ but have a smaller phase modulation. For example in a FLC SLM the phase modulation may depend on the particular liquid crystal used. Other kinds of SLM may switch faster in a configuration with a smaller phase modulation, and switching time improvement may be favoured over phase modulation range size. It is also possible to make use of an SLM with a phase modulation considerably smaller than $\pi$, for example $\pi/4$, by choosing appropriate phase values for the diffractive element. For example, there could be two sub pixels in the diffractive element with a constant phase offset, such as could be provided by a surface relief grating. Let us take these offsets as $-\pi/4$ and $\pi/4$, respectively. Let us assume that the corresponding two sub pixels in the SLM can realize a binary change in the phase from 0 to $\pi/4$ if they are switched on. Thus one sub pixel generates the phase values of $-\pi/4$ or 0 and the other sub pixel generates the phase values of $\pi/4$ or $\pi/2$. The principle is to use different constant phase offsets for each sub pixel of a macro pixel.

One advantage of this example compared to the second example is that no light absorption takes place due to SLM pixels which are switched off. Therefore it is more efficient in terms of reconstruction intensity.

Equations (1), (2) and (3) refer to macropixels where all individual pixels inside a macropixel have the same size. In the case of a macropixel consisting of individual pixels of different sizes the individual terms in the sum have to be weighted with additional amplitude factors corresponding to their size i.e. larger pixels get larger weighting amplitude factors than smaller ones, in proportion to their active area. A preferred setup for the phase elements in example 2 and example 3 would be to choose the phase values in the single pixel in such a way as to get an equally spaced grid for the resulting complex values of the macropixel. An equally spaced grid means that in a complex plane with the real part as one axis and the imaginary part as the other axis the distance between each pair of neighbouring complex values is approximately constant. Instead of what is called an 'equally spaced grid' it may be also in some cases desirable to use what is named here an 'amplitude phase grid' which means fixed amplitude steps—for example 0, x, 2x, 3x and so on and within each amplitude several equidistant phase steps for example 0, $\pi/8$, $\pi/4$ ... $7\pi/8$.

FIG. 4 illustrates the third example by means of a macropixel made of 4 individual pixels. In this example all 4 pixels of the fixed phase element have different phases. For this element phase values for the pixel of the phase element have been chosen which are different when compared to FIG. 2A, namely: 0, $\pi/4$, $\pi/2$ and $3\pi/4$.

By switching the SLM pixels the total phase of the combination phase element and SLM can be changed. In this example each SLM pixel has 2 possible phase states of 0 and $\pi$ (see FIG. 4B). The example in FIG. 4C shows phase states which lead in summation to the complex value of the macropixel with an amplitude of approximately 2.6 and a phase of approximately 0.39 rad.

Figure 5A:
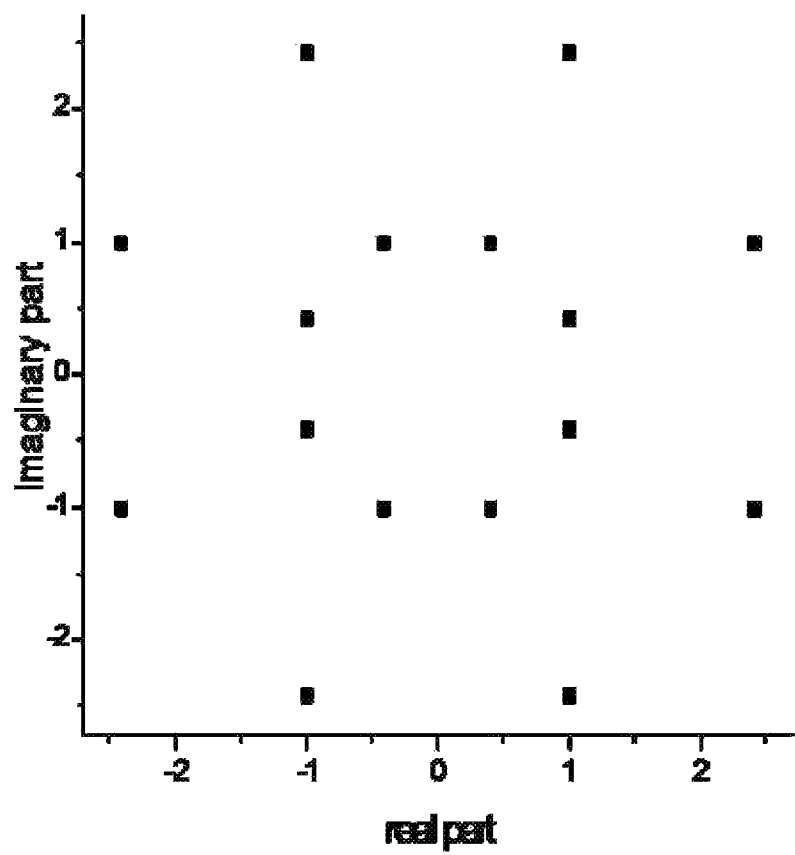
FIG. 5A shows the complex values that can be obtained by summing over the macropixel, with a setup as shown in FIG. 4 for the case of phase values of the diffractive phase element as in FIG. 4A.

FIG. 5A illustrates the complex values that can be obtained with the setup shown in FIG. 4 for different switching states of SLM pixel. With the special phase element shown in FIG. 4A, 8 different phase values can be obtained and each of these phase values may be obtained with 2 different amplitudes. This configuration may either be used as a pure phase SLM with 8 phase levels by using only 8 combinations or one can make use of all 16 possible combinations. In this example the resulting complex values are not on what was called an equally spaced grid. Instead of this they are on what is called an "amplitude phase grid": different amplitude levels, each of them with a certain number of phase levels.

Figure 5B:
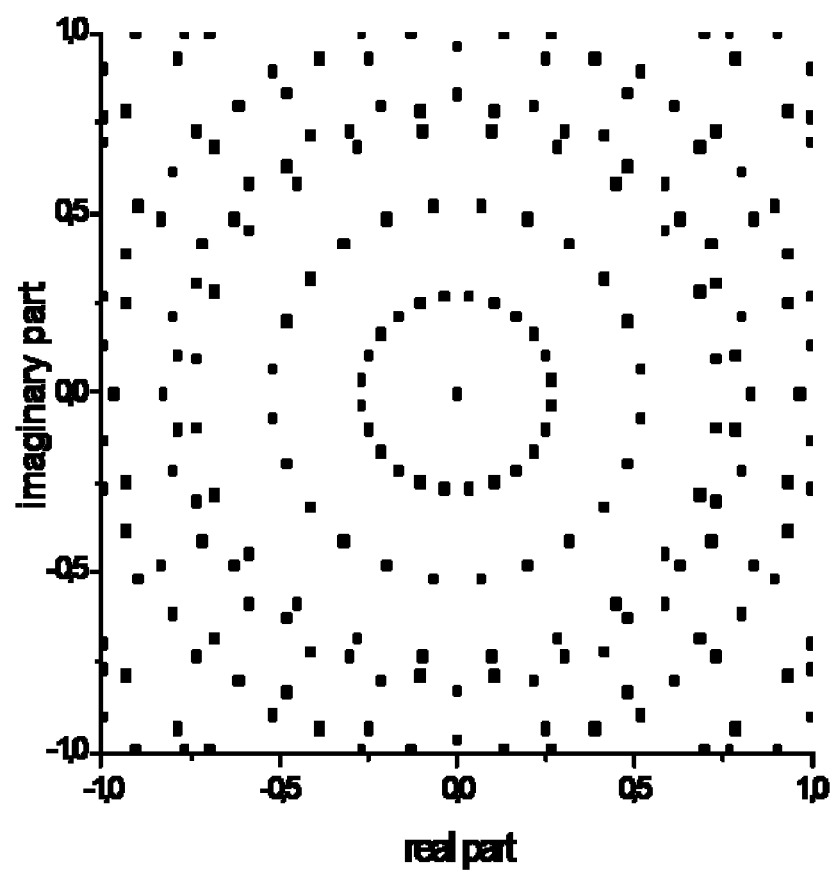
FIG. 5B shows the complex values that can be obtained by summing over the macropixel, with a similar setup to that for FIG. 5A, but for a macropixel with a larger number of pixels.

FIG. 5B shows a part of the complex values that can be obtained with a similar setup but more pixels—12 instead of 4—in each macropixel, with the phase values of the diffractive element pixels being 0, $\pi/12$, $\pi/6$ ... $11\pi/12$. The resulting type of "amplitude phase grid" can be seen even better in this example. There are certain amplitudes—although non equidistant—each with a certain number of phase values—shown as circles. Such a grid may be advantageous for complex valued hologram encoding. In general the example is not limited to such a type of grid. Other grids may also be obtained for this example by choosing appropriate phase values for the pixel of the diffractive element. For the avoidance of doubt, it is confirmed that the point (0+0i) in FIG. 5B may be generated, and that this therefore means one can select the dark state, in contrast to FIG. 5A. The fact that one may generate the dark state using appropriate parameters is an important property of this example, and is in contrast to FIG. 5A in which the point (0+0i) was not generated. For a display element, the ability to generate the dark state is an advantage as it means no other element may be necessary in order to fully control the amplitude of the transmitted light beam.

Comparing the maximum total values of real and imaginary parts in FIG. 5A with those of FIG. 3 shows that for this configuration the total light efficiency may be advantageous compared to example 2 where part of the light may be absorbed in the SLM due to one or more pixels being switched off.

FIG. 6 illustrates again the third example by means of a macropixel made of 4 individual pixels. The difference compared to FIG. 4 is due to the fact that now the SLM has a smaller phase modulation range such that the possible phase states of a pixel are 0 and $\pi/4$ as illustrated in FIG. 6B. Values for the pixel of the phase element (see FIG. 6A) are 0, $\pi/2$, $\pi$ and $3\pi/2$ in this example. The example in FIG. 6C shows phase states given from the combination of the diffractive element in FIG. 6A and the SLM state in FIG. 6B.

Figure 7:
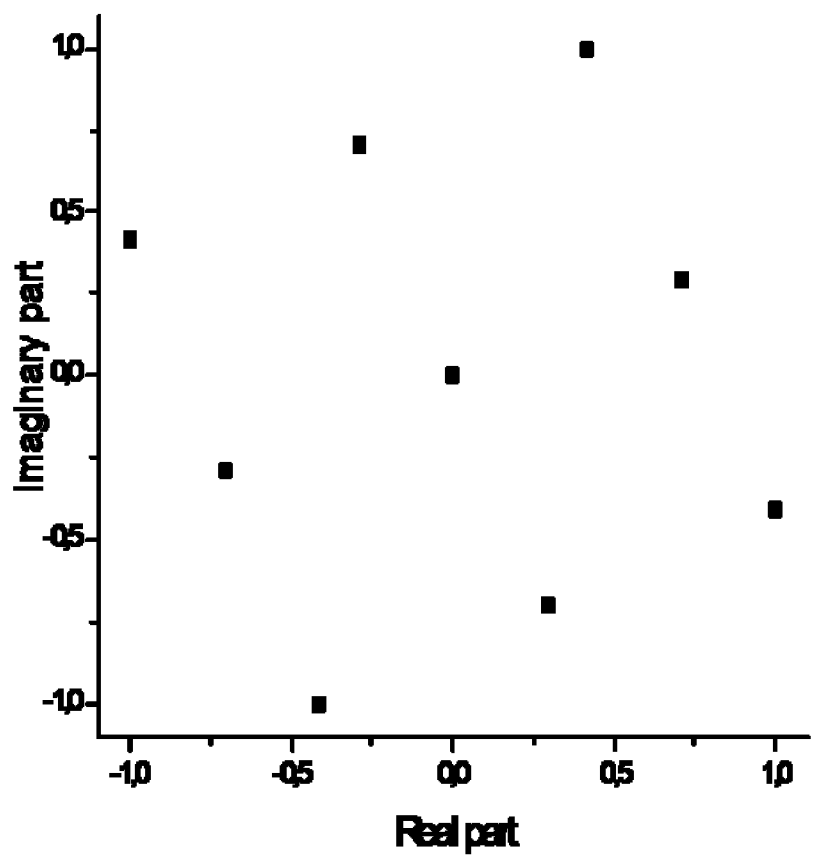
FIG. 7 shows the complex values that can be obtained by summing over a macropixel like the one shown in FIG. 6 in case of phase values of the diffractive phase element as in FIG. 6A.

FIG. 7 illustrates the complex values that can be obtained with the setup shown in FIG. 6 for different switching states of the SLM pixels. For this particular setup only 9 different states can be obtained, which is less than the maximum possible of $2^4=16$ if other parameters are used.

The aim of FIGS. 6 and 7 is to show that the device in principle still works even with a phase SLM having a much lower phase modulation range than $\pi$. This means a much wider range of SLM types may be used compared to most normal phase modulation applications using only an SLM without the diffractive element, where a single pixel phase modulation of $\pi/4$ would be much too small to obtain satisfactory results.

In order to obtain the desired output values of the macropixel—for example the output values on a given grid as described above—it is necessary to find a suitable setup method for the diffractive element pixel and the SLM providing this output. This can be done by setting up a set of equations either from Eqs. (2) or (3) where the desired complex values $C_m$ (where $m=0 \ldots 2^N$) or part of them may be fixed, and from this the $p_j$ and optionally also the step size of the binary SLM have to be found as variables.

However, care has to be taken because there are more equations ($2^N$ in number) than variables (N+1 in number), so not all the possible $2^N$ complex values are independent of each other in general. Mathematical simulation using the set of equations, such as was performed in generating FIGS. 5A and 5B, is a method of ensuring that the macropixel will have the desired properties. In particular it can be used to verify that there is a reasonably dense and uniformly distributed set of possible states on the complex plane, and/or that the number of degenerate states is relatively low, or zero. A device may then be constructed which utilizes the results of this method.

The above description was made for a binary SLM. It is possible to extend this concept to an SLM with more quantization levels. For an SLM with k quantization levels and a macropixel with N pixels it is in principle possible to obtain to $k^N$ different output values, as would be obvious to one skilled in the art.

Due to the existence of macropixels, the total number of pixels in an SLM to be addressed in order to write an array of hologram values of a certain size is strongly increased compared to a standard setup without macropixels. A disadvantage could be the increase of data transfer rates. However, a preferred hardware addressing scheme for such an SLM in order to avoid this possible disadvantage is that the desired total value of the macropixel is transferred by data line from an external source where it has been calculated—for example in a PC—to the SLM and there to the macropixel, whereas the switching state of the individual pixel inside a macropixel is determined locally in the local region encompassing the macropixel. The latter can be done for example with a suitable electronic element inside the macropixel, for example a TFT. The individual pixel values may be either recalculated each time or, in order to avoid arithmetic operations they can be predetermined and saved in a look up table. Then data transfer inside the macropixel only takes place over a short distance, from a common position to the individual pixel. This also reduces requirements for the pixel structure and for data lines between the pixels.

The diffractive element and the SLM may in principle be used as two separate mechanical components. For example both may be included in a device for reconstruction of holograms. A possible disadvantage of this setup would be the cost of mechanical alignment. Alternatively both elements may be combined to form a single mechanical device. A diffractive element may be glued on an SLM, or it may also be integrated directly in an SLM. For example a diffractive phase element may be set up directly as an in-cell retarder—a phase retarding element inside the LC substrate glass near the LC layer, or an amplitude diffractive element may be included by modifying locally the transmission of the LC substrate glass.

In a further example, a micromirror SLM is used because there is also the possibility to directly modify the mirror array. For example individual mirrors may be changed in their reflectivity by modifying the mirror layers in order to obtain the effect of an amplitude diffractive element. Or individual mirrors may get a fixed offset in their height on the substrate which corresponds to a fixed phase offset between individual pixels in order to obtain the effect of a phase diffractive element. Mechanically this would be a single component but it acts like the combination of a fixed diffractive element with a variable SLM, which means it is an alternative configuration.

B. Homogenization of One or More Macropixels

Relating to the implementation described in part A, the implementation described in this section may be combined with the light modulating element of part A, greatly improving its performance. However, the implementation described in this section can also be used in other setups namely a single SLM or a single diffractive element, for example with a single phase SLM.

There exist SLMs (i.e. variable light modulators) with a fixed intrinsic pixel structure and other types of SLM where this does not hold for example optically addressable SLMs, which permit a continuous form of light modulation. The following description refers to a pixelated light modulating element but it also includes the types of SLM which do not have an intrinsic pixel structure themselves but where some kind of grid pattern similar to a pixel structure can be achieved by the writing process.

Often a single pixel of such a light modulating element is not capable of representing the total information of one number of the array to be written in the element.

For example the light modulating element may not be directly able to display a complex number from a hologram data array with a single pixel. In this case writing of the data, for example hologram data, may take place in a manner such that one complex number is represented by a group of (usually adjacent) phase or amplitude pixels. In this description this procedure is referred to as "encoding." The group of pixels is called a macropixel.

For some types of encoding, especially when using several phase values, this splitting into a group of more than one pixel may cause deviations from the desired result of light modulation, meaning for example deviations in the actual hologram reconstruction from the desired reconstruction. Deviations can be caused by the angular variations of phase offset between different pixels in a macropixel. In the case of phase modulation, there are iterative calculation methods to reduce these errors for example described in the patent application WO2007082707A1 of the applicant which may have the disadvantage of high calculation effort. Another patent application of the applicant (application number DE 10 2007 0217740 or PCT/EP2008/055211) includes structured layers for compensating the angular variations of phase offset. Such compensation layers may have the disadvantage that they may be difficult to manufacture.

There are further applications different from representing complex numbers where also a macropixel may be used to represent one value: for example an amplitude value. For example for binary amplitude light modulating elements it is known that several adjacent pixels may be combined to form a macropixel in order to emulate grey levels. By switching on a different number of binary pixels, the total transmittance of the macropixel is changed. This works similarly to half tone printing.

The following description is relevant for all cases where a group of pixels of a light modulating element is combined to form one macropixel.

The pixel structure of the light modulating element may form a rectangular grid. If the light modulating element is used in a setup where it is illuminated with coherent light and used in combination with a focussing means—for example in a hologram reconstruction, then this grid leads to a periodic repetition in the plane of the Fourier transform of the light modulating element in the form of higher diffraction orders.

Depending on the laminar extension of a pixel the intensity in the Fourier plane decreases for higher diffraction orders. The extent of this decrease is governed by the pixel shape and by the variation in amplitude and phase transmission over the pixel, called pixel transparency hereafter.

If all pixels of the phase modulating element have the same shape and the same pixel transparency, then this corresponds mathematically to a convolution of the values written to the single pixel of the light modulating element with a function describing pixel shape and pixel transparency. In the Fourier plane this is equivalent to a multiplication of the transform of the data written in the light modulating element with the transform of the pixel characterising function.

For many applications it is desirable to make use of at most one diffraction order and to have low light intensity in other diffraction orders.

If several pixels of a light modulating element are combined to form a macropixel then the usable range in the Fourier plane—called encoding order hereafter—is often limited to a part of a diffraction order. This extension of the encoding order is inversely proportional to the pitch of the macropixel grid.

As a macropixel is composed of several smaller pixels and the intensity decreases in the Fourier plane depending on the size of a single pixel area, this may lead to an unfavourable distribution of the light intensity in the Fourier plane, which means a large part of light intensity is outside the encoding order.

One consequence of this fact is that in a device for reconstruction of holograms written in a light modulating element using macropixels, light sources with a higher intensity have to be used for illuminating the hologram. This would be the case for a hologram with uniform pixels having the same size as one macropixel, in order to obtain the same light intensity of the hologram reconstruction.

In WO 2004/044659 (US2006/0055994) filed by the applicant and in other patent applications filed by the applicant (e.g. WO 2006/066919, WO 2006/027228 or WO 2006/066906), a method and device for calculation and reconstruction of holograms is described, where a reconstruction of a 3D scene can be seen from within a virtual observer window. The observer window must have at least approximately the size of one eye pupil. It may also have approximately the total size of one eye. For a given light modulating element included in such a device for hologram reconstruction, the virtual observer window can have at most the extension of one encoding order. A separate observer window is generated for each of an observer's two eyes.

Light outside the encoding order for each observer window leads to an undesirable effect in such a device, particularly in a case where an image intended for one eye of the observer enters the other eye of the observer. The effect is similar to the known effect of crosstalk in a stereoscopic display. The use of macropixels for encoding hologram values may increase significantly this undesirable eye crosstalk compared to use of uniform pixels having the same size as one macropixel.

Although the description in this specification emphasizes the use of coherent illumination, there may also be other applications in which incoherent illumination is used where a uniform pixel would also be advantageous compared to a macropixel. Examples include fast switching optical data arrays being used for optical interconnects, i.e. for use in fast optical information transfer. Possible applications include for telecommunications and for optical data storage. A further example is where binary optical elements are transformed into continuous level working elements, or elements which have a greater number of levels than a binary state device.

It is desirable to obtain a light modulating element which allows the use of a macropixel, in which single pixels have properties which are easier to achieve than, but are more limited than, the total functionality of the macropixel. For example single pixels for amplitude modulation, or single pixels for phase modulation, are easier to achieve than a single complex valued pixel. In another example, a binary state pixel may be easier to achieve than a continuously modulated pixel. However, the overall configuration is one in which each macropixel acts in a way such that it can be treated as being a larger uniform pixel for some purposes. Advantages of macropixels include: encoding errors in hologram reconstruction for phase encoding can be reduced or avoided; an improved light intensity distribution in the Fourier plane of the light modulating element can be obtained, and for holograms which generate virtual observer windows, crosstalk between the right eye and left eye virtual observer windows can be reduced.

According to the present implementation:
  for each macropixel of a light modulating element a homogenizing element is added in the optical path after the macropixel, in a way such that the light output of the macropixel is mixed, and that the output of the homogenizing element is equivalent to one homogeneous pixel.
  the homogenizing element may have a common input aperture for all pixels of the macropixel—in this case this input aperture may have approximately the size of a macropixel.
  alternatively the homogenizing element may have several separated input apertures—at most one for each pixel of the macropixel. In this case the single input apertures may have approximately the size of a single pixel.
  in each of the above mentioned two cases (single input aperture and several separated input apertures) the homogenizing element has a common output aperture for each macropixel—this output aperture may have approximately the size of a macropixel.

In one implementation, the output amplitude and/or phase of the homogenizing element is allowed to vary over this output aperture, for example in a way that the transmission at the aperture border is lower than at the aperture centre, but restricted to cases where all single pixels contribute in the same way to this variation, for example that light from each individual pixel has lower intensity at the macropixel border that at the centre of the macropixel output. Such variation over the homogenizer aperture may even be induced for specific purposes. With this homogenizing element the light output of several amplitude and or phase pixels, or complex pixels, can be mixed. It is also possible to use such an element for the mixture of light from different colour pixels. In this case it would be an incoherent mixture of the light from each single pixel. Nevertheless this may still be useful for applications using coherent light because it increases the effective aperture of the individual colour pixels.

FIG. 8 illustrates the principle of macropixel homogenization. In the example shown in FIG. 8, one macropixel is composed of 4 individual amplitude pixels in a 2 by 2 array, where each pixel may be either fully transparent (white) or fully opaque (black) (see FIG. 8A). The aim of the use of macropixels in this case would be to emulate grey levels with a binary light modulating element. FIG. 8A shows 3 macropixels, each of which is a 2 by 2 array, each of which has a different number of white states. The light output of each macropixel may be homogenized using one of the examples described in this section. FIG. 8B shows schematically the possible output of a homogenizer. Instead of a macropixel with different white and black states, a uniform grey level output from each 2 by 2 pixel array is obtained where the grey level of each macropixel depends on the sum of the states of its individual 2 by 2 pixel array.

FIG. 8C shows the result of using a different homogenizing element compared to FIG. 8B. FIG. 8C illustrates that the output of the homogenizer does not have to be uniform over its whole aperture. Instead it may vary for example from the center to the border as shown in FIG. 8C. But this output variation over the output aperture must in an ideal case not depend at all on the states of the macropixel's individual pixels, or in a real case it should depend at least only to a minor degree on the states of the macropixel's individual pixels. In FIG. 8C, for all 3 macropixels the homogenizer array has an output that decreases radially from the macropixel center to the macropixel border, whereas the total transmission over each homogenizer element is proportional to the desired grey level.

Two examples of this implementation are described hereafter, but others will be obvious to those skilled in the art.

There exist elements known as a "light pipe" or an "integrator rod" which are used for example in order to homogenize laser beams. Such an "integrator rod" may be a glass rod or a hollow rectangular rod, which is based either on the principle of total internal reflection or it may have metallized surfaces in order to internally reflect the light. When such devices are used for laser beam homogenisation, they usually have an extension of a few mm in the lateral dimensions and an extension of a few tens of mm in longitudinal dimension. The ratio of longitudinal to transversal extension is typically about 12.5:1. The laser beam may be inhomogeneous at the input; individual rays are totally internally reflected several times at the borders of the rod. At the output of the rod the laser beam intensity is homogenized or at least it is more uniform.

The first example of an implementation is the use of an "integrator rod" to achieve macropixel homogenisation.
  The dimensions of the rod are adapted to typical macropixel structures.
  Instead of a single rod, an array of rods is used with one rod for each macropixel.
  In a preferred option this rod array is integrated into one single mechanical element because for a light modulating element with a large number of macropixels it is not feasible to position each single rod at each macropixel individually.

Figure 9:
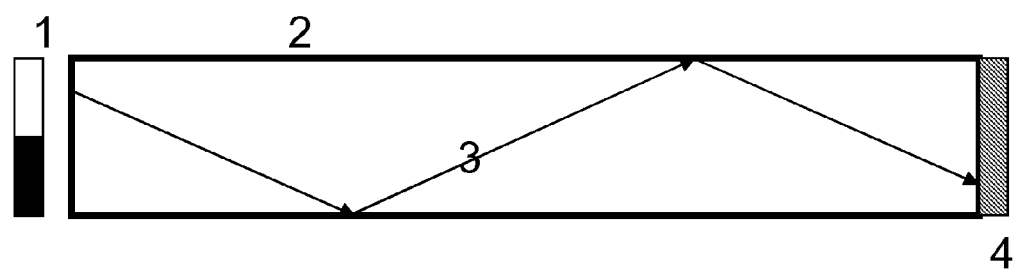
FIG. 9 shows a schematic diagram of a homogenizing rod, from a side view.

FIG. 9 shows schematically a homogenizing rod in side view. A macropixel 1 is positioned at the input of the homogenizing rod 2. Light of all the individual pixels of 1 (here two are shown) may enter the rod. In this example only one of the two pixels is switched on. An example of a light ray 3, entering the rod from the upper pixel and being totally internally reflected two times is shown. Different light rays spread light from this pixel over the whole output aperture of the rod. The homogenized light distribution 4 at the output of the rod is shown schematically.

The lateral extension of one rod element has to be approximately the same as that of a macropixel. Typical macropixel dimensions may be in the range of 50 μm (micrometers) to 100 μm. Based on a ratio of longitudinal to transversal extension of 12.5:1, the longitudinal extension then would be typically 0.6 mm to 1.2 mm. That means the total thickness of a light modulating element would not be greatly increased by adding such a homogenizing array. Nevertheless, some tasks of homogenization may be improved by longer rods.

FIG. 10 shows schematically a rod array with several macropixels and a rod for each macropixel in side view and in top view. In FIG. 10A, two light beams are drawn as examples. Reflection takes place at the interfaces between each two adjacent rods. Reflection takes place if a metal coating on the side walls is used. Total internal reflection takes place in an optical fiber like a wave guide, that means if the core of the rod has a higher refractive index and the cladding has a lower refractive index. An air gap between the rods will increase the angular range over which total internal reflection occurs, because air has a low refractive index. In this schematic example pixel and rods with a fill factor approaching 100% have been drawn for the sake of simplicity. Of course the concept is also valid for pixels and for rods with smaller fill factors.

The longitudinal extension of about 1 mm is in the range of a typical liquid crystal (LC) SLM substrate glass thickness. In the case of a light modulating element including an LC SLM, one possible setup may be to exchange the LC SLM substrate glass with an integrated rod array substrate. The LC SLM substrate glass has to be processed in order to be coated with TFT, electrode alignment layers and so on, and therefore has to fulfil several conditions such as chemical stability at elevated temperatures when in contact with layers deposited on the LC SLM substrate glass. Such criteria may not be satisfied by the integrated rod array. However another possibility is to use a combination of a very thin LC SLM substrate glass compounded with a rod array substrate such that the combination of both gives the desired mechanical stability while still maintaining the desired properties for processing the substrate and getting a minimized total thickness.

In order to integrate a rod array directly into a glass plate, the refractive index of the glass plate may be modulated periodically consistent with the dimensions of a macropixel grid. This may be such that at the position corresponding to the border of each macropixel, there is a refractive index minimum, such as to promote the internal reflection of light. Or it may be alternatively such as to obtain a periodic gradient index profile within the bulk of the glass plate, laterally across the plate, with a period equal to the macropixel period for each basis vector direction of the macropixel array in the plane of the plate, for guiding the light rays in the bulk of the glass plate as they propagate approximately parallel to the surface normal of the glass plate. Alternatively a glass plate with periodic holes in one-to-one correspondence with a macropixel grid may be fabricated. In addition the side surfaces of these holes may be metallized, or they may afterwards be filled with a material of higher refractive index to promote internal reflection. A capillary plate may be used as the set of integrator rods. For example capillary plates with circular capillaries up to 25 μm diameter and a plate thickness of 1 mm as shown in FIG. 12 are available as a commercial product from HAMAMATSU PHOTONICS K.K., Electron Tube Center, 314-5, Shimokanzo, Toyooka-village, Iwata-gun, Shizuoka-ken, Japan. Such plates might be modified to somewhat larger diameters and eventually to a rectangular capillary shape and to a rectangular array in order to fit the macropixel shape and array size. Such arrays could be used as the rod array. One way to use them would be to metallize the capillary surfaces. This can be done by vacuum deposition of metal, e.g. aluminium.

To realize metallic structures with high aspect ratios, "Lithography electroplating and molding" (LIGA) can be used. Another possibility would be to fill the capillaries with some transparent material of higher refractive index—either a liquid or a solid state material—in order to get a structure which promotes total internal reflection. In the case of using a liquid, the plate might be set up in some kind of a sandwich configuration to stop the liquid from escaping. Instead of the capillary plate, for example wet chemical etching or plasma etching may be used as a method for fabricating a rod array.

A second example makes use of elements comparable to optical connectors, known from telecommunications. Several kinds of fiber connectors have been developed. An overview of these types is given for example in B. E. A. Saleh, M. C. Teich, Fundamentals of Photonics, 2nd edition, (John Wiley & Sons, New York, 2007) pages 1024-1025, although others are known. One of the types of connector mentioned in this reference is a fan-out element where a single fiber input is split into several outputs. The same element may also be used for light propagating in the opposite direction as a fan-in element in order to combine the light coming out of several fibers into one fiber. In this second example an array of such fan-in elements is used to combine the light coming from several pixels into one macropixel.

Figure 11:
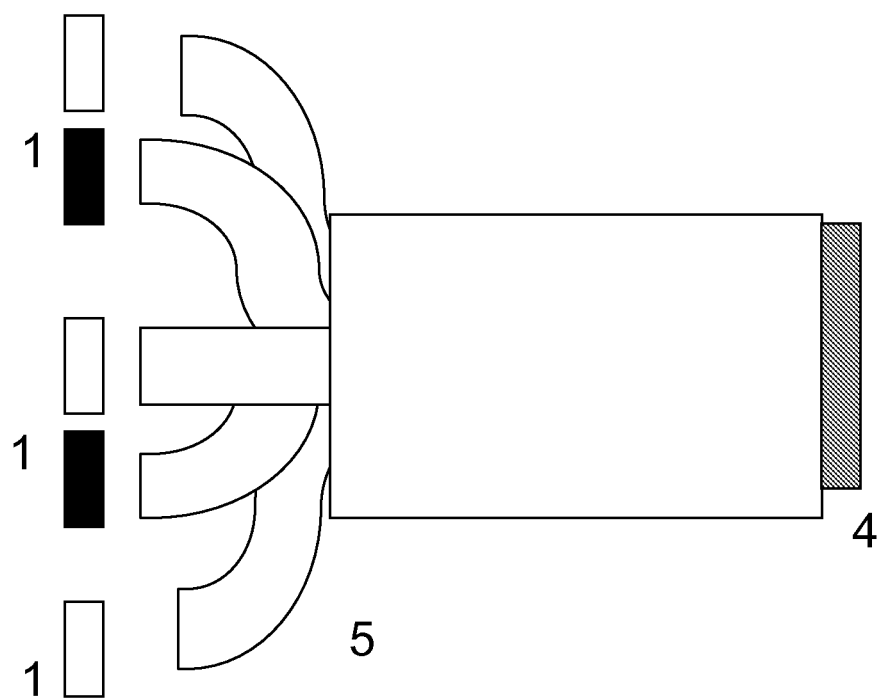
FIG. 11 shows a schematic diagram of a fan-in fiber coupler being used as a homogenizer.

FIG. 11 illustrates in schematic form the second example using a fan-in fiber coupler. In this case for each pixel of the macropixel there is a separate input fiber. These fibers are then coupled and have a common output. Mixing of the pixel inputs may take place in the common segment of the fiber after the coupling, for example by internal reflection. The individual fiber elements at the inputs may be modified to compensate for or to generate offsets as described above. The homogenizing element may be set up as an array of such fan-in fiber couplers.

One possibility would be some type of light modulating element where the individual pixels themselves are composed of or include optical fibers, for example like the one described in the patent application US20050201715. The light output of several fibers making up the individual pixels of a macropixel (for example amplitude or phase fibers) may then be combined and mixed using a fan-in coupler with the output to a common macropixel fiber. It is also possible to combine some special kind of fiber optic phaseplate including an array of fan-in elements with other types of light modulating elements, for example a LC-SLM. This special kind of phaseplate then at the input side has one fiber for each pixel of the light modulating element and at the output has one fiber for each macropixel.

For these two examples of homogenizing elements in the form of a rod array or of a fiber coupler array, the minimum requirements on the particular setup of the elements hold for mixing of signals of different amplitudes from individual pixels. If one uses these homogenizing elements for mixing the signals of phase pixels or complex pixels including phase information, care has to be taken that the mean optical path length through the element should be the same for each individual pixel of the macropixel. "Mean optical path length" means that individual rays may have different path lengths but the average path length over many rays from each pixel should be mutually consistent. This condition is readily fulfilled at least in a symmetrical configuration with 2 or 4 Pixels, where the left, right, upper and lower pixels have equal mean distances to the borders of the rod and to the output of the coupler. For a macropixel with more than four pixels, there may be a difference in the mean optical path especially between an inner and an outer pixel of the macropixel. Inner pixels are ones that are not directly in contact with the border of the macropixel, in contrast to an outer pixel. Also there may be some loss of light intensity inside the homogenizing element with an effect on the mixing of amplitude and phase pixels as well. For example in an "integrator rod" the reflection coefficient at the borders usually will be less than 100%. Also in this case some of the individual pixels of the macropixel might be differently affected by the light loss than others. For example in a macropixel with more than 4 pixels, an inner pixel might be less affected by light loss than an outer pixel.

If the characteristic of the homogenizing element—which means its deviation from ideal behaviour—is known, it might be possible to adapt the values of the individual pixel in such a way as to compensate for effects such as different optical path or different light loss. For example, in an amplitude modulating element the amplitude of individual pixels can be multiplied by a correction factor, or in a phase modulating element the phase of the individual pixel can be given an offset correction.

In a more general way, even if the output of a homogenizing element depends nonlinearly on the input values of the single pixel, if this characteristic is known, it is possible for example to list the relation of input states of individual pixels to the output states of the homogenizing element in a look-up table and then to choose for a desired output state the combination of input pixel values that fit best to this output state and to write these values in the pixels before the light modulating elements.

For some kinds of hologram encoding, a certain phase offset between individual pixels of a macropixel is mandatory. This is the case in detour encoding, for example Burckhardt encoding where 3 amplitude pixels with a detour phase offset of $2\pi/3$ are used to represent one complex number. As the homogenized pixel cannot make use of a detour phase offset in this case, the homogenizing element may be set up such as to include a specific difference in optical path length for the individual pixel in a macropixel as a substitute for the detour phase. Alternatively the light modulating element and homogenizer may be combined with an additional element, generating these phase offsets.

Optical path lengths for individual pixels may be influenced in the homogenizing element either by a certain modification of the surface shape or by local variation of the refractive index near the input of the homogenizing element. For example in a fan-in fiber coupler the length or the refractive index of individual fibers in the fiber segment before coupling them to a larger fiber may be chosen to be different to each other. Through this procedure either different optical paths of individual pixel may be compensated for, if necessary, or they may be induced in cases where this is desirable. In a more general way, there are different opportunities to homogenize sub pixel structures of a macro pixel. For instance it is possible to use micro lens arrays to realize the effect described here. This means that this principle of sub pixel homogenization is not limited to the use of light mixing rods: other implementations are feasible.

C. Matrix-Type Optical Element for Homogenisation of the Light Fields of the Pixels of a Macro-Pixel This example relates to a matrix-type optical element for homogenisation of the light fields of the pixels of a macro-pixel, and to technological solutions for manufacturing such matrix-type optical elements.

By way of motivation, when combining multiple pixels so as to form a macro-pixel, a problematic aspect is that the individual pixels generate a smaller periodically recurring structure than the macro-pixels. This causes diffraction effects due to the periodic structure of the individual pixels. In order to minimise or even to eliminate the diffraction effects of the individual pixel, the periodic pixel structure must be eliminated, or its effect must be reduced.

Figure 13:
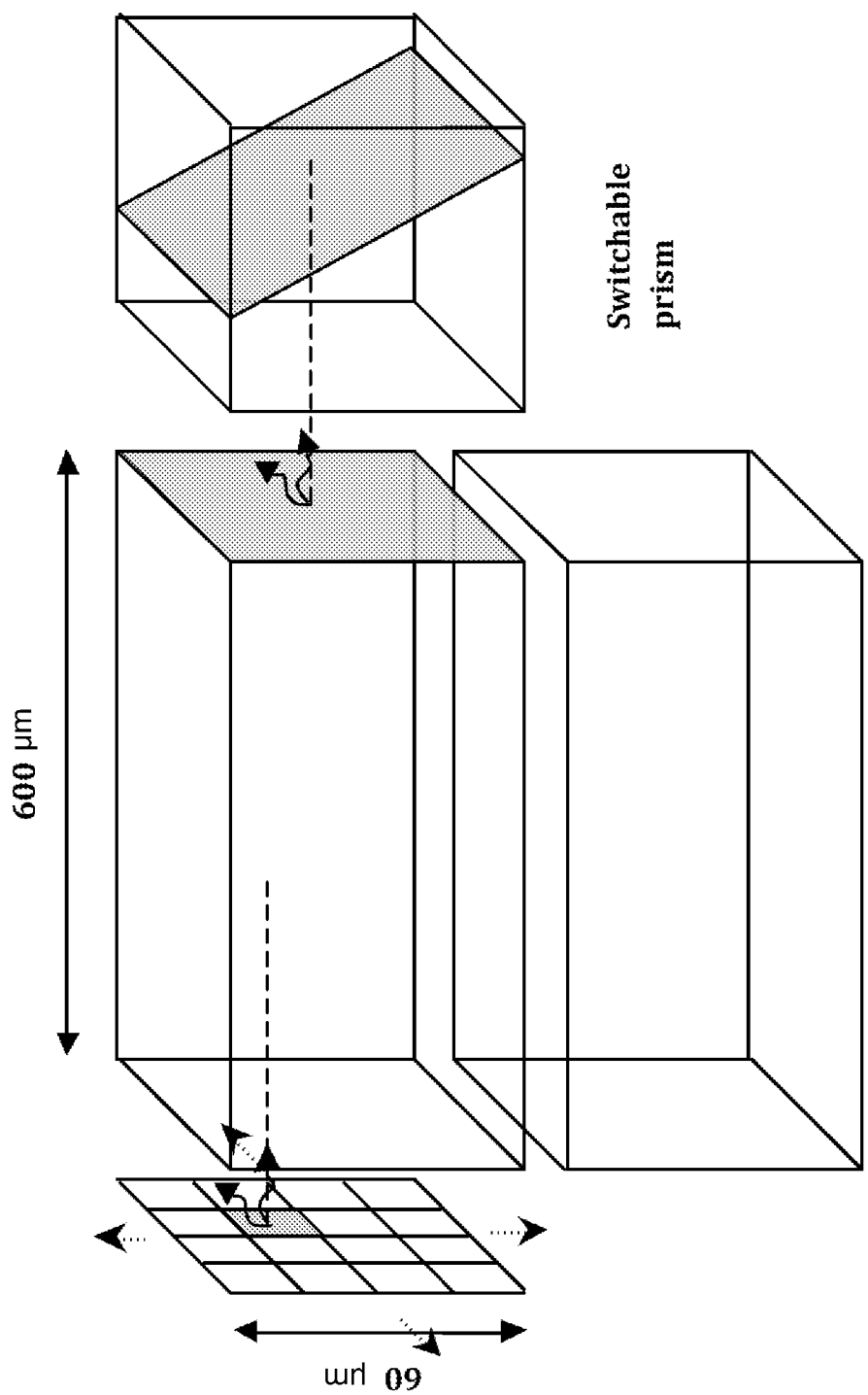
FIG. 13 shows a schematic diagram of light pipes with macro-pixels.

Further, it is useful to provide a possibility for bridging the spatial distance through which the light field propagates between a pixel or macro-pixel, and a subsequent optical element, such as an electro-wetting optical element or a switchable prism element. An example is shown in FIG. 13, in which the macropixel pitch is 60 µm, the pixel pitch is one quarter of the macropixel pitch, and the light pipe is 600 µm long. The light pipe is followed by a switchable prism element. Other pixel and macro-pixel pitches and light pipe lengths will be obvious to those skilled in the art. In general, a light pipe might also be referred as a light mixing rod or a light combining rod, having a light combining or light mixing function, respectively.

A compact arrangement of a holographic display device may be generated as described in WO2008049906, which is incorporated by reference. WO2006119760 provides a further example of an arrangement of a holographic display, which provides for magnified holographic reconstructions, and is incorporated here by reference.

Figure 14:
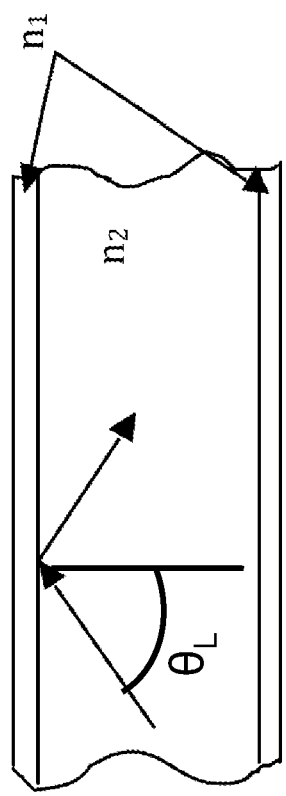
FIG. 14 shows a diagram of a light pipe, where the refractive index of the core of the light pipe is greater than the refractive index near the edge of the light pipe.

The function of the homogenisation and the effect of bridging the spatial distance are realised by light pipes which are arranged in a matrix structure. The homogenisation is achieved by way of light guidance in the light pipe. When reducing the refractive index of the optical medium at the edge of the light pipes, a total internal reflection is achieved under the following condition:

$$\sin\theta_L = \frac{n_1}{n_2},$$

where $n_2 > n_1$, and $\theta_L$ is the angle of incidence of the light ray on the interface between the two regions with refractive indexes $n_1$ and $n_2$. This is shown in FIG. 14. The required difference in the refractive index which must be reached at the edge of the light pipe can be calculated with the help of the following equation for an emission of a sub-pixel with a maximum emission angle $\theta_A$ for total internal reflection inside the light pipe, where the refractive index $n_o$ is the refractive index of the light source.

$$n_0 \sin\theta_A = \sqrt{n_2^2 - n_1^2}$$

As the total number of macro-pixels is very large, a very large number of light pipes (LP) of conventional design must be arranged e.g. in the form of standard optical integrator rods or fibres. Since this is a very difficult process, an improved manufacturing method is given below.

Figure 15:
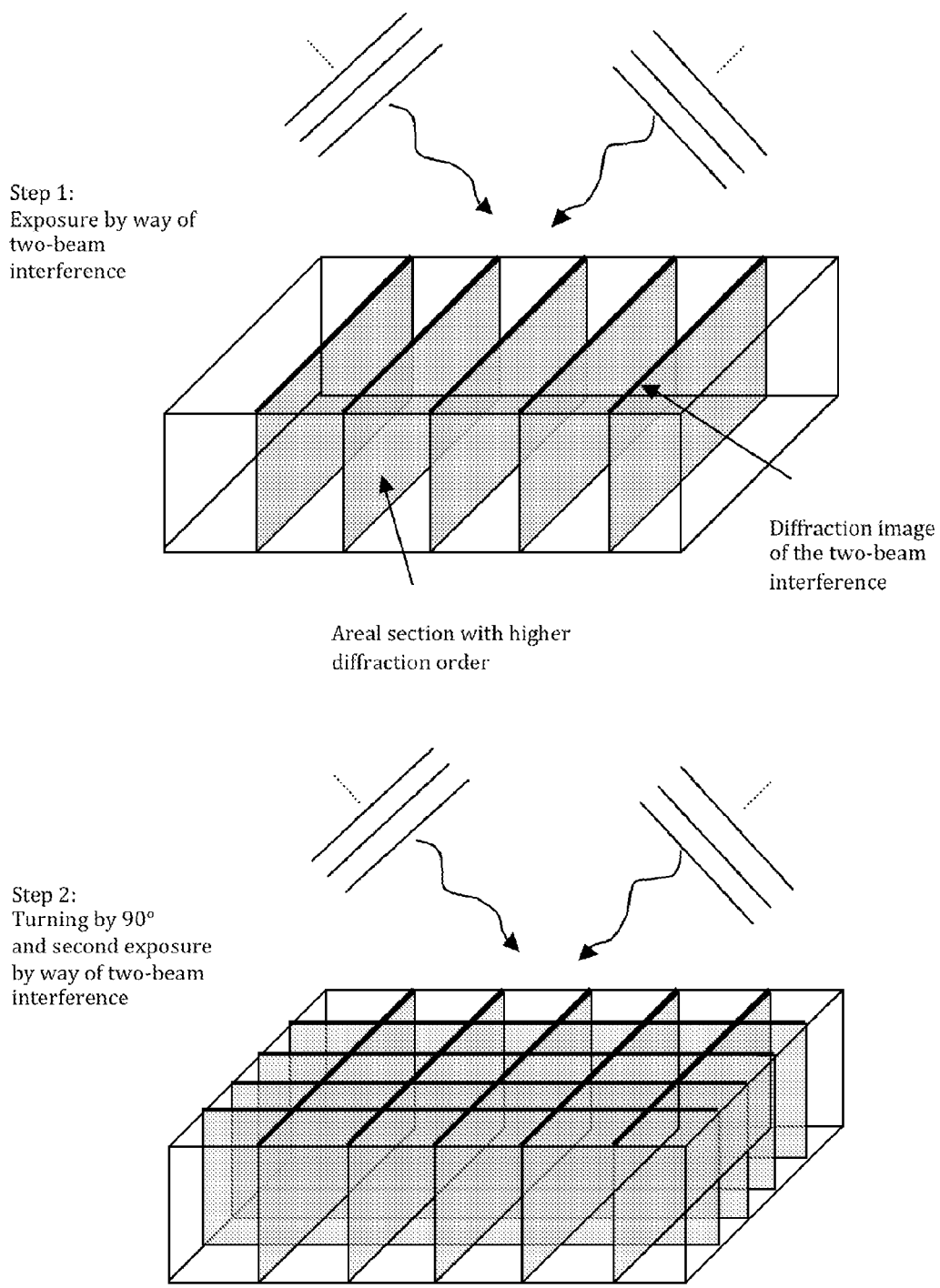
FIG. 15 shows a diagram of a manufacturing process, in which a matrix arrangement of light pipes is written into an optical medium in a targeted manner by way of optical exposure.

The manufacturing method is as follows. An example of this method is shown in FIG. 15. The matrix arrangement of the light pipes is written into an optical medium in a targeted manner by way of optical exposure. The exposure causes a difference in the refractive index: here, the exposure leads to a reduction in the refractive index in the exposed regions relative to the non-exposed regions. To achieve this, an optical medium is used which changes its refractive index when being irradiated with a certain light wavelength. Suitable optical media may be optically polymerizable media which may be used in other applications to form holograms, or to form media with a spatially varying refractive index. Such media are disclosed in EP0294122B1 and US2004219457, for example. Another example for such media are photopolymers being provided by the company DuPont. These photopolymers change the refractive index in dependence on an exposure of an illumination intensity pattern, e.g. of a two beam interference as described below. These photopolymers are available as holographic recording films from DuPont under the name OmniDex™, e.g. HRF150x001, HRF600x001 or HRF700x015. These holographic recording films can be used to make volume gratings. Furthermore, the company Bayer AG provides photopolymers for holographic data storage which can be used as such media. The material Tapestry™ can be made up to 1 mm thick and are used in holographic data storage systems of InPhase Technologies.

A first line pattern can be exposed by way of two-beam interference. The distance (pitch) of the lines can be defined by the angle between the propagation directions of the two plane waves. After turning either the exposed medium or the light sources by 90° about an axis perpendicular to the plane of the exposed medium, a second line pattern which is orthogonal to the first line pattern can be exposed in the exposed medium, thus creating a matrix of LPs.

Alternatively, these refractive index barriers can be exposed by way of direct scanning using masks. If the mask consists of a set of light transmitting apertures, each aperture corresponding to the body of a light pipe, then here the exposure leads to an increase in the refractive index in the exposed regions relative to the non-exposed regions, in order to produce light guiding properties in the light pipes.

A different way to manufacture light pipes is to use silver halide films. In a first step, the film with a selected predefined thickness is exposed to an interference pattern, generated by a two beam or to a four beam light interference. The film can be a positive or a negative material. Fuji Film offers such a film for holographic applications under the name Fuji Film Silver Halide Holographic Film F HL. The film material is a panchromatic photosensitive emulsion coated on a TAC (Tri-Acetate Cellulose) base and has a very small grain size. If this film is developed, than absorbing side walls are created. These black areas consist of silver particles which are not connected to each other. This is like the so called platinum black, which consists of small sized Pt particles. These particles can be metalized with a chemical solution. Thus, silver side walls can be made. Now these sidewalls are reflective and not longer absorptive.

Further applications are possible. If two phase pixels are used for encoding holograms, the two phase values can describe a part of a complex-valued function. However, if the pixels are spatially displaced, the phase relation between the two pixels will change when the two pixels are viewed at non-zero viewing angles, especially for large viewing angles. In one approach, a retarder may be used to overcome this problem by creating an angle-dependent phase lag. By using an above-described light pipe, however, the phase values of the two pixels when the light exits the LP would be superimposed, thus making a retarder superfluous. A light pipe matrix will provide this effect for a matrix of pixels.

The fill factor for the transmission can be improved by adapting the light exit face of the LP to the subsequent optical element (e.g. the switchable prisms shown in FIG. 13). Further, apodisation, such as providing Gaussian transmission profile apertures, can be applied directly onto the light exit face of the matrix. An example is shown in FIG. 16A. The transmittance through the switchable prism can be improved by applying a curvature onto the light exit face of the LP. An example is shown in FIG. 16B.

Figure 17:
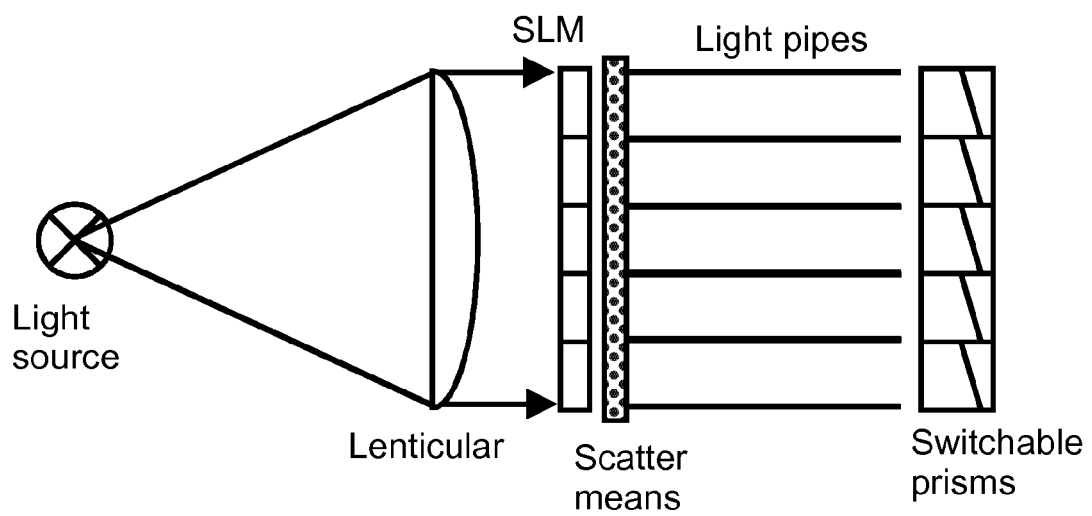
FIG. 17 shows in a schematic representation an arrangement according to a preferred embodiment of the present invention comprising a scatter means.

According to a preferred embodiment of the present invention, a scatter means is implemented at or near the entrance plane of the light pipe. By these means it is possible to reduce the length (or the thickness with respect to the light propagation direction or optical axis as e.g. indicated in FIG. 16A or 16B) of the light pipes, since the light entering the light pipes is scattered by the scatter means. This arrangement is shown in FIG. 17. This results in a broader variety of directions, in which the light rays propagate through the light pipes. As an example, directions being smaller than 30 degrees relative to the optical axis can be achieved. Because the light propagating through the light pipes comprises a lot of different propagation directions, the probability of combination, mixing and/or interfering of the light is higher. It is therefore possible to use shorter light pipes while achieving similar results than without the use of the scatter means. The scatter means can be designed such that a suppression of higher diffraction orders in the plane of the virtual observer window (VOW) of a holographic display is achieved. The approach of applying a scatter means can also be used for an optimization of the resulting intensity distribution and/or the resulting angular emission of the light passing through the macropixels. The scatter means can be designed such that a predicted or desired intensity distribution and/or angular emission of the light emitting or passing the macropixel can be achieved.

Figure 18A:
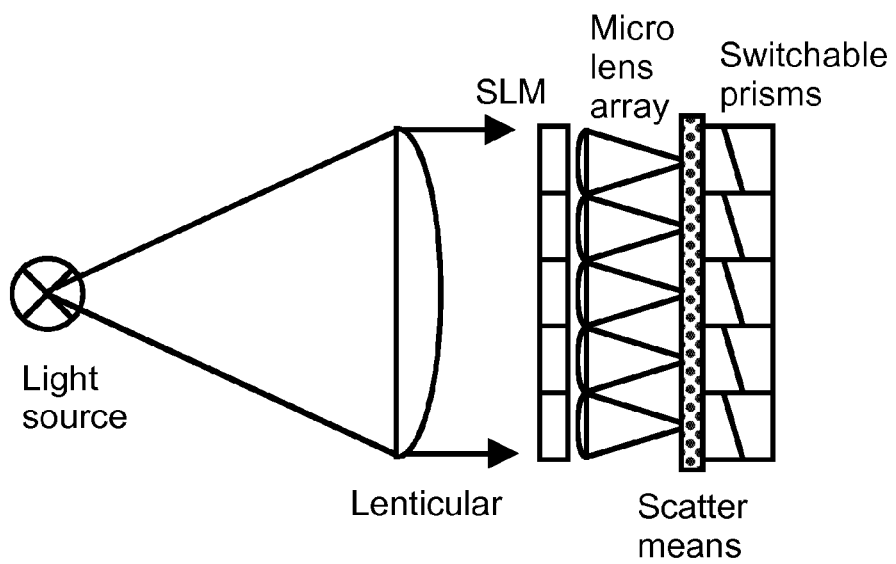
FIG. 18 shows in a schematic representation an arrangement according to a preferred embodiment of the present invention, wherein in FIG. 18A a micro lens array is arranged between the SLM and the scatter means, wherein in FIG. 18B a defined surface relief profile is arranged between the SLM and the scatter means, wherein in FIG. 18C a graded index profile is arranged between the SLM and the scatter means, and wherein in FIG. 18D a scatter means is arranged between the light pipes and the switchable prisms.

Additionally or alternatively, it is also possible to use a scatter means at the exit plane of the light pipe (shown in FIG. 18D) in order to generate a predefined or a desired light emission characteristic. An example for such a predefined or a desired light emission characteristic is an intensity profile being proportional to e.g. a cosine-, a cosine^2- or a Gauss-function and/or a spectrum of plane waves with a predefined angular light propagation distribution. Preferably, the predefined or the desired light emission characteristic is rotationally symmetrical with respect to the optical axis.

The designed or desired intensity distribution in the plane of the scatter means, e.g. a cosine-function, can be provided by a refracting optical element or a diffracting optical element. An example for an optical element operating on a refracting basis is a micro lens array or is comparable to a micro lens array (shown in FIG. 18A). An example for an optical element operating on a diffracting basis is an essentially optical transparent medium comprising a defined internal refraction index variation or a defined surface relief profile (shown in FIG. 18B). By applying the scatter means, the angular emission of the resulting macropixels is optimized for the holographic display application.

Alternatively or additionally, an additional phase function in front of the sub pixels can be applied. By these means, a further reduction of the length of the light pipes can be achieved. A phase function can be realized for example with micro lenses, prisms and/or pyramidal prisms being located on top of each sub pixel (i.e. between the sub pixels and the light pipes). This might optimize the resulting intensity distribution of the macropixel and/or reduce the length of the light pipes. Especially for the application of a holographic display, a desired or an optimized intensity profile of a macropixel might e.g. be a homogenous intensity distribution or an intensity profile of the cross section of a macropixel. This enables a sufficient suppression of higher diffraction orders in the plane of the virtual observer window (VOW). This means, that it is not necessary to implement an absorptive apodisation layer at the entrance plane of a subsequent optical element (e.g. the electro wetting prism array or the switchable prisms). Intensity profiles can be generated with that approach which comprises a light intensity throughput being proportional to e.g. a cosine-, a cosine^2- or a Gauss-function. By generating the intensity/apodisation profile by the arrangement of the scatter means and/or a phase function in combination with the light pipes and not by using absorptive filter layers will enhance the light efficiency of a holographic display by a factor of 1.5 or more, e.g. two. This is because no light is absorbed or reflected on additional physical structures (like filters) but is propagated through the light pipes while being mixed efficiently.

According to another embodiment of the invention, a scatter means can be applied to a SLM alone. This means especially, that no macropixels or light pipes need to be applied according to this embodiment. To achieve this, e.g. a phase profile or a phase altering means is added near to or at the exit plane of the SLM. This component might be comparable to a micro lens array on top of the pixels (shown in FIG. 18A). It might be necessary to design a surface relief of the beam shaping phase profile or a diffractive binary surface profile (indicated in FIG. 18B) or a graded index profile (indicated in FIG. 18C) for each wavelength of the light to be used and/or for a fixed distance to the plane where the apodisation profile is generated (e.g. a flat top intensity profile is transformed into a cosine like intensity profile). In this plane the scatter means is realized by e.g. a scattering surface or a volumetric scatter. With this scatter means being located at this plane, the suppression of higher diffraction orders in the plane of the virtual observer window (VOW) can be achieved.

Figure 18B:
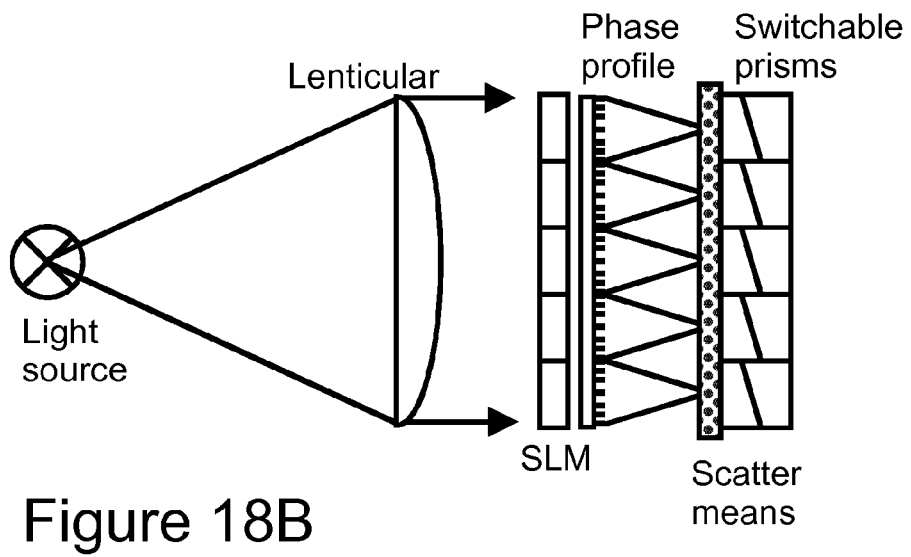
Figure 18C:
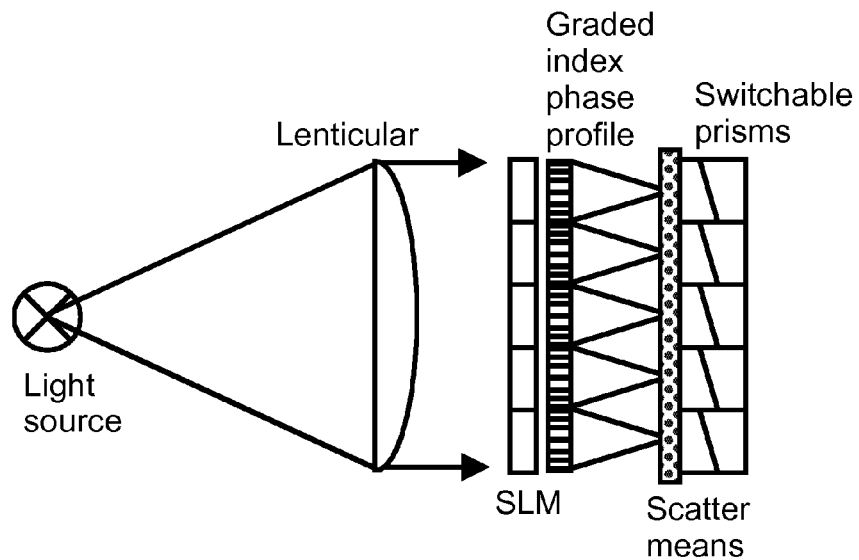
Figure 18D:
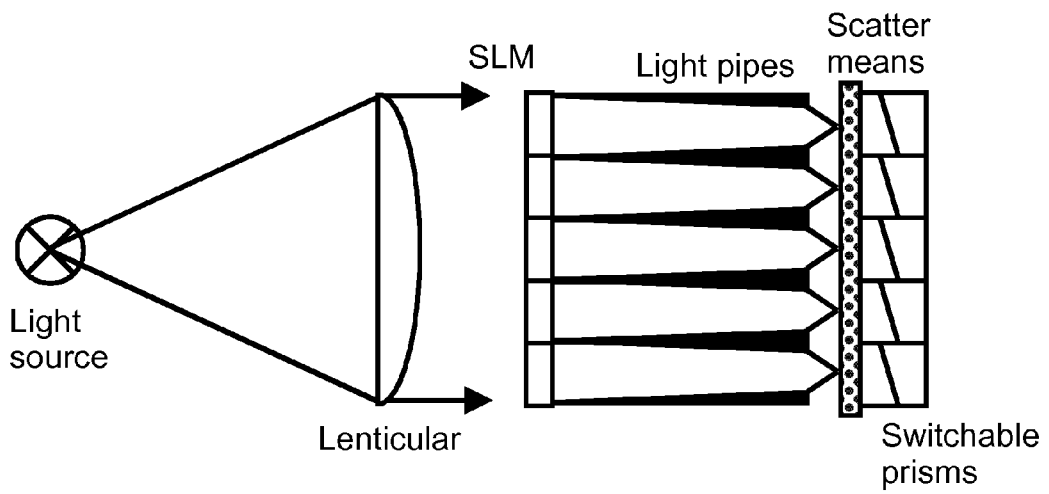

In particular, this embodiment comprises several possibilities for practical realizations being shown in FIG. 18A-18D. All possibilities have in common, that the SLM is illuminated with collimated light. According to a first possibility shown in FIG. 18A, a micro lens array or a structure being comparable to a micro lens array is arranged adjacent to the SLM for altering the phase relationship of the light. This micro lens array is arranged downstream of the SLM with respect of the propagation of the light. Therefore, the light passing through the SLM then passes the micro lens array. The scatter means is arranged in a distance of about 1 mm to the micro lens array. According to a second possibility shown in FIG. 18B an element comprising phase altering means operating on a diffractive basis is arranged adjacent to the SLM for altering the phase relationship of the light. This phase altering means is arranged downstream of the SLM with respect of the propagation of the light. Therefore, the light passing through the SLM then passes the phase altering means. The scatter means is arranged in a distance of about 1 mm to the phase altering means. According to a third possibility shown in FIG. 18C, the element comprising phase altering means operating on a diffractive basis as shown in FIG. 18B is replaced by a graded index profile element. The arrangement of the remaining components shown in FIG. 18C is comparable to the arrangement of the components as shown in FIG. 18B. According to a fourth possibility shown in FIG. 18D, the macropixels are arranged adjacent to the SLM. The macropixels are arranged downstream of the SLM with respect of the propagation of the light. Therefore, the light passing through the SLM then passes the macropixels. The scatter means is arranged in a distance of about 0.5 mm to exit plane of the light pipes.

It is possible and can especially be advantageous to combine the subject matter of this embodiment of the present invention with at least one of the implementations as mentioned in Appendix III.

Notes

In the Figures in this document, the relative dimensions shown are not necessarily to scale.

Various modifications and alterations of this invention will become apparent to those skilled in the art without departing from the scope of this invention, and it should be understood that this invention is not to be unduly limited to the illustrative examples and implementations set forth herein.

APPENDIX I

Technical Primer

The following section is meant as a primer to several key techniques used in some of the systems that implement the present invention.

In conventional holography, the observer can see a holographic reconstruction of an object (which could be a changing scene); his distance from the hologram is not however relevant. The reconstruction is, in one typical optical arrangement, at or near the image plane of the light source illuminating the hologram and hence is at the Fourier plane of the hologram. Therefore, the reconstruction has the same far-field light distribution of the real world object that is reconstructed.

One early system (described in WO 2004/044659 and US 2006/0055994) defines a very different arrangement in which the reconstructed object is not at or near the Fourier plane of the hologram at all. Instead, a virtual observer window zone is at the Fourier plane of the hologram; the observer positions his eyes at this location and only then can a correct reconstruction be seen. The hologram is encoded on a LCD (or other kind of spatial light modulator) and illuminated so that the virtual observer window becomes the Fourier transform of the hologram (hence it is a Fourier transform that is imaged directly onto the eyes); the reconstructed object is then the Fresnel transform of the hologram since it is not in the focus plane of the lens. It is instead defined by a near-field light distribution (modelled using spherical wavefronts, as opposed to the planar wavefronts of a far field distribution). This reconstruction can appear anywhere between the virtual observer window (which is, as noted above, in the Fourier plane of the hologram) and the LCD or even behind the LCD as a virtual object.

There are several consequences to this approach. First, the fundamental limitation facing designers of holographic video systems is the pixel pitch of the LCD (or other kind of light modulator). The goal is to enable large holographic reconstructions using LCDs with pixel pitches that are commercially available at reasonable cost. But in the past this has been impossible for the following reason. The periodicity interval between adjacent diffraction orders in the Fourier plane is given by $\lambda D/p$, where $\lambda$ is the wavelength of the illuminating light, D is the distance from the hologram to the Fourier plane and p is the pixel pitch of the LCD. But in conventional holographic displays, the reconstructed object is in the Fourier plane. Hence, a reconstructed object has to be kept smaller than the periodicity interval; if it were larger, then its edges would blur into a reconstruction from an adjacent diffraction order. This leads to very small reconstructed objects—typically just a few cm across, even with costly, specialised small pitch displays. But with the present approach, the virtual observer window (which is, as noted above, positioned to be in the Fourier plane of the hologram) need only be as large as the eye pupil. As a consequence, even LCDs with a moderate pitch size can be used. And because the reconstructed object can entirely fill the frustum between the virtual observer window and the hologram, it can be very large indeed, i.e. much larger than the periodicity interval. Further, where an OASLM is used, then there is no pixelation, and hence no periodicity, so that the constraint of keeping the virtual observer window smaller than a periodicity interval no longer applies.

There is another advantage as well, deployed in one variant. When computing a hologram, one starts with one's knowledge of the reconstructed object—e.g. you might have a 3D image file of a racing car. That file will describe how the object should be seen from a number of different viewing positions. In conventional holography, the hologram needed to generate a reconstruction of the racing car is derived directly from the 3D image file in a computationally intensive process. But the virtual observer window approach enables a different and more computationally efficient technique. Starting with one plane of the reconstructed object, we can compute the virtual observer window as this is the Fresnel transform of the object. We then perform this for all object planes, summing the results to produce a cumulative Fresnel transform; this defines the wave field across the virtual observer window. We then compute the hologram as the Fourier transform of this virtual observer window. As the virtual observer window contains all the information of the object, only the single-plane virtual observer window has to be transformed to the hologram and not the multi-plane object. This is particularly advantageous if there is not a single transformation step from the virtual observer window to the hologram but an iterative transformation like the Iterative Fourier Transformation Algorithm. Each iteration step comprises only a single Fourier transformation of the virtual observer window instead of one for each object plane, resulting in significantly reduced computation effort.

Another interesting consequence of the virtual observer window approach is that all the information needed to reconstruct a given object point is contained within a relatively small section of the hologram; this contrasts with conventional holograms in which information to reconstruct a given object point is distributed across the entire hologram. Because we need encode information into a substantially smaller section of the hologram, that means that the amount of information we need to process and encode is far lower than for a conventional hologram. That in turn means that conventional computational devices (e.g. a conventional digital signal processor (DSP) with cost and performance suitable for a mass market device) can be used even for real time video holography.

There are some less than desirable consequences however. First, the viewing distance from the hologram is important—the hologram is encoded and illuminated in such a way that only when the eyes are positioned at the Fourier plane of the hologram is the optimal reconstruction seen; whereas in normal holograms, the viewing distance is not important. There are however various techniques for reducing this Z sensitivity or designing around it, and in practice the Z sensitivity of the holographic reconstruction is usually not extreme.

Also, because the hologram is encoded and illuminated in such a way that optimal holographic reconstructions can only be seen from a precise and small viewing position (i.e. precisely defined Z, as noted above, but also X and Y co-ordinates), eye tracking may be needed. As with Z sensitivity, various techniques for reducing the X,Y sensitivity or designing around it exist. For example, as pixel pitch decreases (as it will with LCD manufacturing advances), the virtual observer window size will increase. Furthermore, more efficient encoding techniques (like Kinoform encoding) facilitate the use of a larger part of the periodicity interval as virtual observer window and hence the increase of the virtual observer window.

The above description has assumed that we are dealing with Fourier holograms. The virtual observer window is in the Fourier plane of the hologram, i.e. in the image plane of the light source. As an advantage, the undiffracted light is focused in the so-called DC-spot. The technique can also be used for Fresnel holograms where the virtual observer window is not in the image plane of the light source. However, care must be taken that the undiffracted light is not visible as a disturbing background. Another point to note is that the term transform should be construed to include any mathematical or computational technique that is equivalent to or approximates to a transform that describes the propagation of light. Transforms are merely approximations to physical processes more accurately defined by Maxwellian wave propagation equations; Fresnel and Fourier transforms are second order approximations, but have the advantages that (a) because they are algebraic as opposed to differential, they can be handled in a computationally efficient manner and (ii) can be accurately implemented in optical systems.

Further details are given in US patent application publications US 2006-0138711, US 2006-0139710 and US 2006-0250671, the contents of which are incorporated by reference.

APPENDIX II

Glossary of Terms Used in the Description

Computer Generated Hologram

A computer generated video hologram CGH is a hologram that is calculated from a scene. The CGH may comprise complex-valued numbers representing the amplitude and phase of light waves that are needed to reconstruct the scene. The CGH may be calculated e.g. by coherent ray tracing, by simulating the interference between the scene and a reference wave, or by Fourier or Fresnel transform.

Encoding

Encoding is the procedure in which a spatial light modulator (e.g. its constituent cells, or contiguous regions for a continuous SLM like an OASLM) are supplied with control values of the video hologram. In general, a hologram comprises of complex-valued numbers representing amplitude and phase.

Encoded Area

The encoded area is typically a spatially limited area of the video hologram where the hologram information of a single scene point is encoded. The spatial limitation may either be realized by an abrupt truncation or by a smooth transition achieved by Fourier transform of a virtual observer window to the video hologram.

Fourier Transform

The Fourier transform is used to calculate the propagation of light in the far field of the spatial light modulator. The wave front is described by plane waves.

Fourier Plane

The Fourier plane contains the Fourier transform of the light distribution at the spatial light modulator. Without any focusing lens the Fourier plane is at infinity. The Fourier plane is equal to the plane containing the image of the light source if a focusing lens is in the light path close to the spatial light modulator.

Fresnel Transform

The Fresnel transform is used to calculate the propagation of light in the near field of the spatial light modulator. The wave front is described by spherical waves. The phase factor of the light wave comprises a term that depends quadratically on the lateral coordinate.

Frustum

A virtual frustum is constructed between a virtual observer window and the SLM and is extended behind the SLM. The scene is reconstructed inside this frustum. The size of the reconstructed scene is limited by this frustum and not by the periodicity interval of the SLM.

Imaging Optics

Imaging optics are one or more optical components such as a lens, a lenticular array, or a microlens array used to form an image of a light source (or light sources). References herein to an absence of imaging optics imply that no imaging optics are used to form an image of the one or two SLMs as described herein at a plane situated between the Fourier plane and the one or two SLMs, in constructing the holographic reconstruction.

Light System

The light system may include either of a coherent light source like a laser or a partially coherent light source like a LED. The temporal and spatial coherence of the partially coherent light source has to be sufficient to facilitate a good scene reconstruction, i.e. the spectral line width and the lateral extension of the emitting surface have to be sufficiently small.

Virtual Observer Window (VOW)

The virtual observer window is a virtual window in the observer plane through which the reconstructed 3D object can be seen. The VOW is the Fourier transform of the hologram and is positioned within one periodicity interval in order to avoid multiple reconstructions of the object being visible. The size of the VOW has to be at least the size of an eye pupil. The VOW may be much smaller than the lateral range of observer movement if at least one VOW is positioned at the observer's eyes with an observer tracking system. This facilitates the use of a SLM with moderate resolution and hence small periodicity interval. The VOW can be imagined as a keyhole through which the reconstructed 3D object can be seen, either one VOW for each eye or one VOW for both eyes together.

Periodicity Interval

The CGH is sampled if it is displayed on a SLM composed of individually addressable cells. This sampling leads to a periodic repetition of the diffraction pattern. The periodicity interval is $\lambda D/p$, where $\lambda$ is the wavelength, D the distance from the hologram to the Fourier plane, and p the pitch of the SLM cells. OASLMs however have no sampling and hence there is no periodic repetition of the diffraction pattern; the repetitions are in effect suppressed.

Reconstruction

The illuminated spatial light modulator encoded with the hologram reconstructs the original light distribution. This light distribution was used to calculate the hologram. Ideally, the observer would not be able to distinguish the reconstructed light distribution from the original light distribution. In most holographic displays the light distribution of the scene is reconstructed. In our display, rather the light distribution in the virtual observer window is reconstructed.

Scene

The scene that is to be reconstructed is a real or computer generated three-dimensional light distribution. As a special case, it may also be a two-dimensional light distribution. A scene can constitute different fixed or moving objects arranged in a space.

Spatial Light Modulator (SLM)

A SLM is used to modulate the wave front of the incoming light. An ideal SLM would be capable of representing arbitrary complex-valued numbers, i.e. of separately controlling the amplitude and the phase of a light wave. However, a typical conventional SLM controls only one property, either amplitude or phase, with the undesirable side effect of also affecting the other property.

APPENDIX III

Concepts

There are multiple implementations (described as 'Concepts A-G') in this disclosure defined below.

A. Macropixel Holographic Display as a Combination of an SLM and a Fixed Diffractive Element A holographic display, comprising an SLM and a diffractive element, in which groups of two or more adjacent pixels of the SLM in combination with the corresponding groups of pixels in the diffractive element form macropixels, each macropixel being used to represent a numerical value which is manifested physically by the states of the pixels of the SLM and the states of the pixels of the diffractive element which form the macropixel.

- number of accessible states for each macropixel is greater than the number of states accessible by each SLM pixel group, or that may be found fixed in a diffractive element pixel group when the display is in use
- for each macropixel a homogenizing element is present in the optical path after the macropixel
- SLM pixels can only take on a limited number of values
- SLM pixels can only take on binary values
- diffractive element pixels only take on a limited number of values
- diffractive element pixels only take on two different values
- diffractive element pixels only take on fixed values
- virtual observer windows are created at the eyes of one or more observers
- macropixel encodes amplitude values
- macropixel encodes phase values
- macropixel encodes complex numbers
- each pixel of the SLM is allocated to exactly one pixel of the diffractive element
- adjacent pixels of the SLM in combination with the group of adjacent allocated pixels of the diffractive element are used to form each macropixel
- several macropixels may be combined to form a larger unit
- different macropixels of the diffractive element may have different structures or content
- several individual pixels with different sizes and shapes or differences in some other characteristic may be used as parts of a macropixel
- within a given device, different macropixels may also include a different number of single pixels
- the pixels of the diffractive element may each be composed of smaller units
- a diffractive grey scale amplitude element is combined with a binary amplitude SLM
- a diffractive grey scale amplitude element is combined with a binary amplitude SLM, with nonlinear greyscale values in the individual pixels
- a diffractive phase element is combined with a binary amplitude SLM, and in the diffractive phase element for each macropixel there has to be at least one pixel with a phase value different to the other pixels
- as previous point, and neighbouring output values have the same spacing either in the real or in the imaginary direction in the complex plane
- as point two previously, leading to 'amplitude phase grid' which means fixed amplitude steps—for example 0, x, 2x, 3x and so on and within each amplitude several equidistant phase steps for example 0, $\pi/8$, $\pi/4$ . . . $7\pi/8$
- as three previous points, such that the point (0+0i) may be generated, and that this therefore means one can select the dark state
- a diffractive phase element is combined with a phase SLM
- phase SLM allows a full switching between 0 and $\pi$
- phase SLM does not allow a full switching between 0 and $\pi$ but has a smaller phase modulation
- in the case of a macropixel consisting of individual pixels of different sizes, the individual terms in the electric field sum have to be weighted with additional amplitude factors corresponding to their size
- case in which pixels are not switched off
- the device in principle still works even with a phase SLM having a much lower phase modulation range than $\pi$
- the SLM has k quantization levels and a macropixel has N pixels
- the desired total value of the macropixel is transferred by data line from an external source where it has been calculated, whereas the switching state of the individual pixel inside a macropixel is determined locally in the local region encompassing the macropixel
- a diffractive phase element is set up directly as an in-cell retarder
- an amplitude diffractive element is included by modifying locally the transmission of the LC substrate glass
- a micromirror SLM is used
- a micromirror SLM is used such that individual mirrors may be changed in their reflectivity by modifying the mirror layers in order to obtain the effect of an amplitude diffractive element
- a micromirror SLM is used such that individual mirrors receive a fixed offset in their height on the substrate which corresponds to a fixed phase offset between individual pixels in order to obtain the effect of a phase diffractive element Method of generating a holographic reconstruction according to the above B. Method of Obtaining the Desired Output Values of the Macropixel of a Holographic Display Method of obtaining the desired output values of the macropixel of a holographic display, such as output values on an array in the complex plane, using a set of equations either from Eqs. (2) or (3), where the desired complex values $C_m$ (where $m=0\ldots 2^N$) or part of them may be fixed, and from this the $p_j$ have to be found as variables.

the step size of the binary SLM is a further variable to be found a reasonably dense and uniformly distributed set of possible states on the complex plane is generated the number of degenerate states is relatively low, or zero Device according to the method C. Macropixel Light Modulating Device as a Combination of an SLM and a Fixed Diffractive Element A light modulating device, comprising an SLM and a diffractive element, in which groups of two or more adjacent pixels of the SLM in combination with the corresponding groups of pixels in the diffractive element form macropixels, each macropixel being used to represent a numerical value which is manifested physically by the states of the pixels of the SLM and the states of the pixels of the diffractive element which form the macropixel.

number of accessible states for each macropixel is greater than the number of states accessible by each SLM pixel group, or that may be found fixed in a diffractive element pixel group when the device is in use for each macropixel a homogenizing element is present in the optical path after the macropixel SLM pixels can only take on a limited number of values SLM pixels can only take on binary values diffractive element pixels only take on a limited number of values diffractive element pixels only take on two different values diffractive element pixels only take on fixed values macropixel encodes amplitude values macropixel encodes phase values macropixel encodes complex numbers each pixel of the SLM is allocated to exactly one pixel of the diffractive element adjacent pixels of the SLM in combination with the group of adjacent allocated pixels of the diffractive element are used to form each macropixel several macropixels may be combined to form a larger unit different macropixels of the diffractive element may have different structures or content several individual pixels with different sizes and shapes or differences in some other characteristic may be used as parts of a macropixel within a given device, different macropixels may also include a different number of single pixels the pixels of the diffractive element may each be composed of smaller units a diffractive grey scale amplitude element is combined with a binary amplitude SLM a diffractive grey scale amplitude element is combined with a binary amplitude SLM, with nonlinear greyscale values in the individual pixels a diffractive phase element is combined with a binary amplitude SLM, and in the diffractive phase element for each macropixel there has to be at least one pixel with a phase value different to the other pixels as previous point, and neighbouring output values have the same spacing either in the real or in the imaginary direction in the complex plane as point two previously, leading to 'amplitude phase grid' which means fixed amplitude steps—for example 0, x, 2x, 3x and so on and within each amplitude several equidistant phase steps for example 0, $\pi/8$, $\pi/4\ldots 7\pi/8$ as three previous points, such that the point (0+0i) may be generated, and that this therefore means one can select the dark state a diffractive phase element is combined with a phase SLM phase SLM allows a full switching between 0 and $\pi$ phase SLM does not allow a full switching between 0 and $\pi$ but has a smaller phase modulation in the case of a macropixel consisting of individual pixels of different sizes, the individual terms in the electric field sum have to be weighted with additional amplitude factors corresponding to their size case in which pixels are not switched off the device in principle still works even with a phase SLM having a much lower phase modulation range than $\pi$ the SLM has k quantization levels and a macropixel has N pixels the desired total value of the macropixel is transferred by data line from an external source where it has been calculated, whereas the switching state of the individual pixel inside a macropixel is determined locally in the local region encompassing the macropixel a diffractive phase element is set up directly as an in-cell retarder an amplitude diffractive element is included by modifying locally the transmission of the LC substrate glass a micromirror SLM is used a micromirror SLM is used such that individual mirrors may be changed in their reflectivity by modifying the mirror layers in order to obtain the effect of an amplitude diffractive element a micromirror SLM is used such that individual mirrors receive a fixed offset in their height on the substrate which corresponds to a fixed phase offset between individual pixels in order to obtain the effect of a phase diffractive element Method of modulating light according to the above D. Method of Obtaining the Desired Output Values of the Macropixel of a Light Modulating Device Method of obtaining the desired output values of the macropixel of a light modulating device, such as output values on an array in the complex plane, using a set of equations either from Eqs. (2) or (3), where the desired complex values $C_m$ (where $m=0\ldots 2^N$) or part of them may be fixed, and from this the $p_j$ have to be found as variables.

the step size of the binary SLM is a further variable to be found a reasonably dense and uniformly distributed set of possible states on the complex plane is generated the number of degenerate states is relatively low, or zero Device according to the method E. Device with Homogenization of One or More Macropixels Device with a SLM light modulating element such that for each macropixel of the light modulating element a homogenizing element is present in the optical path after the macropixel, in a way such that the light output of the macropixel is mixed.

the output of the homogenizing element is equivalent to the light output of one homogeneous pixel the output amplitude and/or phase of the homogenizing element varies over the output aperture SLM has a fixed intrinsic pixel structure SLM permits a continuous form of light modulation there is a common output aperture for each macropixel the homogenizing element has a common input aperture for all pixels of the macropixel the homogenizing element has two or more separated input apertures the output aperture has approximately the size of a macropixel Device uses at most one diffraction order and there is a low light intensity in other diffraction orders extension of the encoded diffraction order is inversely proportional to the pitch of the macropixel grid Device is a holographic display device Device is a holographic display device which generates a virtual observer window Device is a holographic display device which generates virtual observer windows Hologram display device in which the use of uniform pixels having the same size as one macropixel reduces significantly undesirable eye crosstalk compared to use of non-uniform macropixels for encoding hologram values device includes fast switching optical data arrays being used for optical interconnects, i.e. for use in fast optical information transfer Device in which binary optical elements are transformed into continuous level working elements, or elements which have a greater number of levels than a binary state device Device in which encoding errors in hologram reconstruction for phase encoding is reduced or avoided Device in which an improved light intensity distribution in the Fourier plane of the light modulating element is obtained "integrator rod" is used to achieve macropixel homogenisation, where the dimensions of the rod are adapted to typical macropixel structures an array of rods is used with one rod for each macropixel A rod array is integrated into one single mechanical element air gap is present between the rods in the rod array for rods in the rod array, the core of the rod has a higher refractive index and the cladding has a lower refractive index a very thin LC SLM substrate glass is used which is compounded with a rod array substrate in order to integrate a rod array directly into a glass plate, the refractive index of the glass plate may be modulated periodically consistent with the dimensions of a macropixel grid a glass plate with periodic holes in one-to-one correspondence with a macropixel grid is used to homogenize light A capillary plate is used as the set of integrator rods To realize metallic structures with high aspect ratios for light homogenization, "Lithography electroplating and molding" (LIGA) is used wet chemical etching or plasma etching is used as a method for fabricating a rod array an array of such optical fibre fan-in elements is used to combine the light coming from several pixels into one macropixel A fiber optic phaseplate including an array of fan-in elements is combined with a LC-SLM such that there is one fiber for each pixel of the light modulating element and at the output there is one fiber for each macropixel homogenizing elements used for mixing the signals of phase pixels or complex pixels including phase information, such that the mean optical path length through the element is the same for each individual pixel of the macropixel the values of the individual pixel are modified in such a way as to compensate for non-ideal effects of the homogenizing element the relation of input states of individual pixels to the output states of the homogenizing element are listed in a look-up table and then for a desired output state the combination of input pixel values that fit best to this output state are chosen and are written to the pixels before the light modulating elements the homogenizing element is set up such as to include a specific difference in optical path length for each individual pixel in a macropixel in a fan-in fiber coupler the length or the refractive index of individual fibers in the fiber segment before coupling them to a larger fiber is chosen to be different to each other such different optical paths of individual pixel are compensated for or induced F. Matrix-Type Optical Element for Homogenisation of the Light Fields of the Pixels of a Macro-Pixel Matrix-type optical element for homogenisation of light fields of pixels of a macro-pixel, the matrix consisting of light pipes, in which the light fields are homogenized by total internal reflection inside each light pipe as the light fields propagate along each light pipe.

a scatter means is implemented at or near the entrance plane of the light pipe the scatter means is designed such that a suppression of higher diffraction orders in the plane of a virtual observer window (VOW) of a holographic display is achieved the scatter means is designed such that a predicted or desired intensity distribution and/or angular emission of the light emitting or passing the macropixel can be achieved additionally or alternatively, a scatter means is implemented at or near the exit plane of the light pipe a phase profile is implemented near to or at the exit plane of the SLM G. SLM with a Scatter Means and a Phase Profile for Generating a Light Intensity Distribution Being Proportional to e.g. a Cosine-, a Cosine^2- or a Gauss-Function.

An arrangement comprising a SLM, a scatter means and a phase altering means, the SLM being illuminated essentially with collimated light of at least one light source, the scatter means being arranged downstream of the SLM with respect of the propagation of the light, wherein the phase altering means being arranged between the SLM and the scatter means.

the phase altering means comprises a micro lens array or a structure being comparable to a micro lens array the phase altering means is operating on a diffractive basis the phase altering means being a diffractive binary surface profile or a graded index profile the scatter means is arranged in a predetermined distance to the phase profile, the predetermined distance having a value between the range of 0.1 to 2 mm, the predetermined distance preferably being 0.5 mm

The invention claimed is:

1. A light modulating device, comprising a spatial light modulator and a pixelated optical element, in which a group of at least two adjacent pixels of the spatial light modulator in combination with a corresponding group of pixels in the pixelated optical element form a macropixel, wherein the pixels of the pixelated optical element comprise a fixed content, and the pixels of the spatial light modulator comprise a variable content, wherein each macropixel represents a numerical value being an amplitude value or a phase value or a complex valued number for separately controlling the amplitude and the phase of an incoming light wave, which is manifested physically by the effect of combination of the states of the pixels of the spatial light modulator and the content of the pixels of the pixelated optical element which form the macropixel.

2. The light modulating device of claim 1, wherein the spatial light modulator has pixels that are adjustable to different values of a limited number of possible discrete values, the number of values being ≧2 or wherein the spatial light modulator has k different values of a limited number of possible discrete values and a macropixel has N pixels, k and N being natural numbers.

3. The light modulating device of claim 1, wherein the spatial light modulator has pixels that are adjustable to different values within a continuous range of possible values or wherein the spatial light modulator comprises a ferroelectric liquid crystal.

4. The light modulating device of claim 1, wherein the spatial light modulator has pixels that are adjustable to modulate the amplitude of the light interacting with the spatial light modulator or wherein the pixels of the spatial light modulator are adjustable only between a minimum and a maximum value.

5. The light modulating device of claim 1, wherein the spatial light modulator has pixels that are adjustable to modulate the phase of the light interacting with the spatial light modulator or wherein the spatial light modulator has pixels that are adjustable to modulate the phase of the light interacting with the spatial light modulator and wherein the pixels of the spatial light modulator are adjustable only between two different phase values.

6. The light modulating device of claim 1, wherein the spatial light modulator comprises:
   a micromirror unit, the individual mirrors of the micromirror unit comprising layers with a characteristic suitable to modulate the phase or the amplitude of the light interacting with the micromirror unit; or
   a micromirror unit, the pixelated optical element being implemented into the micromirror unit by lowering the maximum reflectivity of individual mirrors of each macropixel down to different predetermined values or to generate a fixed offset of the individual mirrors of each macropixel in their height on the substrate which corresponds to a predetermined phase offset between individual pixels.

7. The light modulating device of claim 1, wherein the number of accessible states for each macropixel is greater than the number of states accessible by the group of pixels of each spatial light modulator of the macropixel, or wherein the number of accessible states for each macropixel is greater that the number of the fixed states of the group of pixels of the pixelated optical element.

8. The light modulating device of claim 1, wherein the pixelated optical element comprises a diffractive element; or
   wherein the pixelated optical element is located in front of or behind the spatial light modulator with respect to the propagation of light interacting with the light modulating device.

9. The light modulating device of claim 1, wherein several individual pixels of the spatial light modulator or of the pixelated optical element being used as parts of a macropixel comprise pixels of different sizes, the macropixel being encoded such that the individual terms in the electric field sum are weighted with additional amplitude factors corresponding to their size.

10. The light modulating device of claim 1, wherein the pixelated optical element has pixels comprising different modulation values of a limited possible modulation number of discrete values, the number of modulation values being ≧2.

11. The light modulating device of claim 1, wherein:
   the pixels in the pixelated optical element include some pixels that are adjustable to modulate the amplitude or the phase of the light interacting with the pixelated optical element or
   the pixels in the pixelated optical element include some pixels that are adjustable to modulate the amplitude or the phase of the light interacting with the pixelated optical element and wherein some of the pixels of the pixelated optical element comprise at least two different grey scale values for modulating the amplitude of the light interacting with the pixelated optical element.

12. The light modulating device of claim 1, wherein a pixel of the pixelated optical element comprises: an optical medium having a predetermined optical pathlength for modulating the phase of the light interacting with this pixel depending on the predetermined optical pathlength; or
   an optical medium having a predetermined absorption or reflection for modulating the amplitude of the light interacting with this pixel depending on the predetermined absorption or reflection.

13. The light modulating device of claim 1, wherein a pixel of the pixelated optical element is provided as an element inside the substrate glass of the spatial light modulator for modulating the phase of the light interacting with the pixel of the pixelated optical element or wherein a pixel of the pixelated optical element is provided as an element inside an LC substrate glass of the SLM for modulating the amplitude of the light interacting with the pixel of the pixelated optical element.

14. The light modulating device of claim 1, wherein each pixel of the spatial light modulator is allocated to exactly one pixel of the pixelated optical element or wherein groups of at least two adjacent pixels of the spatial light modulator in combination with the corresponding groups of allocated pixels of the pixelated optical element are used to form each macropixel.

15. The light modulating device of claim 1, wherein different macropixels of the pixelated optical element have different structures or content or wherein different macropixels comprise a different number of single pixels of the spatial light modulator or of the pixelated optical element.

16. The light modulating device of claim 1, wherein a pixelated optical element adapted to modulate the amplitude of the light interacting with the pixelated optical element is combined with a spatial light modulator being adapted to modulate the amplitude or phase of the light interacting with the spatial light modulator or wherein a pixelated optical element adapted to modulate the amplitude of the light interacting with the pixelated optical element is combined with a spatial light modulator being adapted to modulate the amplitude or phase of the light interacting with the spatial light modulator and wherein the individual pixels comprise one of the following: greyscale values and nonlinear greyscale values and greyscale values without a common factor.

17. The light modulating device of claim 1, wherein a pixelated optical element adapted to modulate the phase of the light interacting with the pixelated optical element is combined with a spatial light modulator being adapted to modulate the amplitude of the light interacting with the spatial light modulator, and wherein at least one pixel of the pixelated optical element of a macropixel comprises a phase value different to the phase values of the other pixels of the pixelated optical element of the macropixel.

18. The light modulating device of claim 17, wherein:
the pixels of the spatial light modulator or of the pixelated optical element are adapted such that complex output values result in essentially the same spacing either in the real or in the imaginary direction in the complex plane; or
the pixels of the spatial light modulator or of the pixelated optical element are adapted such that complex output values result in essentially the same spacing either in the real or in the imaginary direction in the complex plane and wherein the macropixel is adapted such that it generates the point (0+0i) in the complex plane.

19. The light modulating device of claim 1, wherein a pixelated optical element adapted to modulate the phase of the light interacting with the pixelated optical element is combined with a spatial light modulator being adapted to modulate the phase of the light interacting with the spatial light modulator.

20. The light modulating device of claim 1, wherein a predetermined value to be represented by a macropixel is transferred by a transferring means from an external source where the predetermined value has been calculated, and wherein the switching state of the individual pixels inside a macropixel is determined locally in the local region encompassing the macropixel.

21. The light modulating device of claim 1, wherein for each macropixel a homogenizing element is present in the optical path after the macropixel, the homogenizing element comprising an optical input and an optical output, the homogenizing element being adapted such that output light of the macropixel is entering the optical input of the homogenizing element and is mixed within the homogenizing element and is output at the optical output of the homogenizing element.

22. The light modulating device of claim 21, wherein:
the optical input of a homogenizing element comprises at least one input aperture; or
the optical output of a homogenizing element comprises an output aperture; or
each homogenizing element is adapted to generate output light comprising a characteristic being essentially equivalent to the light output of one homogeneous pixel.

23. The light modulating device of claim 22, wherein:
the homogenizing element is adapted to generate output light with a predetermined amplitude or phase variation over the output aperture of the homogenizing element; or
the output apertures of the homogenizing elements are essentially the same size or
the size of the output aperture of the homogenizing element is approximately equal to the size of a macropixel.

24. The light modulating device of claim 22, wherein the homogenizing element comprises a common input aperture for all pixels of a macropixel or wherein the homogenizing element comprises at least two separated input apertures for the pixels of a macropixel.

25. The light modulating device of claim 21, wherein:
a homogenizing element comprises a rod for achieving a macropixel homogenisation, where an integrator rod comprises dimensions being adapted to the dimensions being typical for macropixel structures; or
an array of rods is provided, a rod of the array being assigned to a macropixel.

26. The light modulating device of claim 25, wherein:
for rods in the rod array, a core of the rod comprises a higher refractive index than the refractive index of a cladding of the rod; or
a very thin LC spatial light modulator substrate glass is compounded with a rod array substrate.

27. The light modulating device of claim 25, wherein a rod array is integrated into a spatial light modulator substrate plate, the refractive index of the substrate plate is modulated periodically consistent with the dimensions of the rod array in order to implement cores and claddings of the rod array.

28. The light modulating device of claim 21, wherein a homogenizing element comprises a capillary plate for achieving a macropixel homogenisation.

29. The light modulating device of claim 25, wherein a matrix arrangement of light pipes is generated by:
writing into an optical medium in a targeted manner by way of optical exposure causing a difference in the refractive index of the optical medium; or
by illuminating a silver halide film with an interference pattern and developing the silver halide film and applying a chemical solution to the silver halide film.

30. The light modulating device of claim 29, wherein a first line pattern is:
generated into the optical medium by exposing the optical medium by way of two-beam interference of two light beams comprising a predetermined wavelength; or
defined by the angle between the propagation directions of the two light beams; and
wherein a second line pattern is generated into the optical medium by exposing the optical medium by way of two-beam interference of two light beams again after either the optical medium or the light sources have been turned by a predefined angle about an axis perpendicular to the plane of the exposed medium.

31. The light modulating device of claim 21, wherein:
a glass plate with periodic holes in one-to-one correspondence with a macropixel grid is used to homogenize light; or
Lithography galvano forming is applied to generate metallic structures with high aspect ratios for light homogenization or for a replication master which is used to generate said light guiding structures.

32. The light modulating device of claim 21, wherein
the optical input of the homogenizing element comprises an array of optical fibre fan-in elements, the optical fibre fan-in elements being adapted to combine light coming from several pixels of a macropixel into the optical output of the homogenizing element; or
the homogenizing element comprises a fiber optic face plate including an array of fan-in elements, the array of fan-in elements being combined with a LC-spatial light modulator such that there is one fiber for each pixel of the light modulating element and at the output there is one fiber for each macropixel.

33. The light modulating device of claim 21, wherein the homogenizing elements are:
used for mixing the signals of phase pixels or complex pixels including phase information, such that the mean optical path length through the element is the same for each individual pixel of the macropixel; or adapted to generate predetermined optical path lengths for light of each individual pixel in a macropixel, the predetermined optical path lengths being different.

34. The light modulating device of claim 21, wherein:
the values of the individual pixels of a macropixel are calculated in such a way as to compensate for non-ideal effects of the homogenizing element; or
the relation of input states of individual spatial light modulator pixels in the macropixel to the output states of the homogenizing element are listed in a look-up table and for a desired output state the combination of input pixel values that fit best to this output state are chosen and are written to the pixels of the spatial light modulator.

35. The light modulating device of claim 21, wherein a scatter means is implemented at or near the optical input of the homogenizing elements, at or near an entrance plane of the homogenizing elements being realized by light pipes.

36. The light modulating device of claim 35 in a holographic display according to claim 43, wherein the scatter means is designed such that a suppression of higher diffraction orders in the plane of a virtual observer window of a holographic display is achieved.

37. The light modulating device of claim 35, wherein the scatter means is:
designed such that a predicted intensity distribution of the light emitting from the macropixel can be achieved; or
is implemented at or near the exit plane of the homogenizing elements.

38. The light modulating device of claim 35, wherein:
a phase profile element is implemented near to or at the exit plane of the spatial light modulator; or
a phase altering means is arranged downstream of the spatial light modulator with respect to the propagation of the light, the phase altering means being arranged between the spatial light modulator and the scatter means.

39. The light modulating device of claim 38, wherein the phase altering means:
comprises a micro lens array or a structure being comparable to a micro lens arrays; or
operates on a diffractive basis; or
comprises diffractive binary surface profile or a graded index profile.

40. The light modulating device of claim 38, wherein the scatter means is arranged in a predetermined distance to the phase profile element or the phase altering means, the predetermined distance having a value between the range of 0.1 to 2 mm.

41. A method of modulating light comprising:
emitting light by a coherent light source onto a light modulating device of claim 1; and
modulating said emitted light using said light modulating device.

42. A display device or a holographic display device comprising a light modulating device of claim 1.

43. The holographic display of claim 42, wherein:
at least one virtual observer window is created at the eyes of one or more observers; or
at least one virtual observer window is created at the eyes of one or more observers and wherein the extension of the virtual observer windows is determined to be equal to or smaller than ow=$D\lambda/mp$, with D being the distance of an observer to the display, $\lambda$ being the wavelength of a light source as part of the holographic display and mp being the pitch of the macropixel grid.

44. The holographic display of claim 42, wherein:
the light modulating device with a homogenizing element is adapted to be operated such that undesirable eye crosstalk between the observer windows for both eyes of an observer compared to the use of the same light modulating device without homogenizing elements is reduced; or
binary optical elements are transformable into continuous level working elements, or elements which have a greater number of levels than a binary state device.

45. A device for use in fast optical information transfer, the device comprising a light modulating device of claim 1, the device further comprising at least one fast switching optical data array for an optical interconnect.

46. Method of obtaining a predetermined value C for a macropixel of a light modulating device of claim 1 or for a holographic display of claim 42, the method comprising the step of generating a value C to be encoded into a macropixel of the light modulating device by applying the equation $$C = a_1 \exp(ip_1) + a_2 \exp(ip_2) + a_3 \exp(ip_3) + \ldots + a_N \exp(ip_N),$$

where $a_j$ is one of the possible values of the amplitude of the spatial light modulator pixel j, j=1 to N, N being the number of the pixels of a macropixel of the spatial light modulator, and $p_j$ is the fixed phase value of pixel j of the pixelated optical element of the macropixel, and the method comprising the step of finding a set of possible values $a_j$ and/or $p_j$ to solve or approximate the equation.

47. Method of obtaining a predetermined value C for a macropixel of a light modulating device of claim 1 or for a holographic display of claim 42, wherein the method comprising the step of generating a value C to be encoded into a macropixel of the light modulating device by applying the equation $$C = \exp i(p_1 + sl_1) + \exp i(p_2 + sl_2) + \exp i(p_3 + sl_3) + \ldots + \exp i(p_N + sl_N)$$

where the $p_j$ is the fixed phase value of pixel j of the pixelated optical element of the macropixel, j=1 to N, N being the number of the pixels of a macropixel of the spatial light modulator, and the $sl_j$ is one of the possible values representing a switchable phase value of the spatial light modulator pixel j, and the method comprising the step of finding a set of possible values $sl_j$ and/or $p_j$ to solve or approximate the equation.

48. The method of claim 46, wherein the values C are to be generated such that a predetermined dense and uniform distribution set of possible states in the complex plane is generated or wherein values C are to be generated such that the number of degenerate states is relatively low, or zero.

49. The method of claim 46, wherein the number of the possible different complex values $C_m$ which can be generated are $2^N$ or wherein the step size of the binary SLM is a further variable to be found.

* * * * *